US011516796B2

(12) United States Patent
Pan et al.

(10) Patent No.: US 11,516,796 B2
(45) Date of Patent: Nov. 29, 2022

(54) METHOD AND APPARATUS OF REQUESTING SEMI-PERSISTENT SCHEDULING RESOURCE FOR TRANSMISSION OF DATA DUPLICATION IN A WIRELESS COMMUNICATION SYSTEM

(71) Applicant: ASUSTek Computer Inc., Taipei (TW)

(72) Inventors: Li-Te Pan, Taipei (TW); Hsin-Hsi Tsai, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 25 days.

(21) Appl. No.: 15/952,816

(22) Filed: Apr. 13, 2018

(65) Prior Publication Data
US 2018/0302886 A1   Oct. 18, 2018

Related U.S. Application Data

(60) Provisional application No. 62/485,553, filed on Apr. 14, 2017.

(51) Int. Cl.
*H04W 72/04* (2009.01)
*H04L 1/18* (2006.01)

(52) U.S. Cl.
CPC ......... *H04W 72/044* (2013.01); *H04L 1/1816* (2013.01); *H04W 72/042* (2013.01); *H04W 72/0406* (2013.01); *H04W 72/0413* (2013.01); *H04L 1/1822* (2013.01)

(58) Field of Classification Search
CPC ........... H04W 72/044; H04W 72/0406; H04W 72/042; H04W 72/0413; H04L 1/1816
See application file for complete search history.

(56) References Cited

U.S. PATENT DOCUMENTS

| 8,379,585 | B2  |   | 2/2013  | Lee    |             |
|-----------|-----|---|---------|--------|-------------|
| 10,178,657 | B2 | * | 1/2019  | Tseng  | H04W 76/20  |
| 2017/0019887 | A1 | * | 1/2017 | Jiang  | H04W 72/14  |
| 2018/0049225 | A1 | * | 2/2018 | Lee    | H04W 36/00  |
| 2018/0049229 | A1 | * | 2/2018 | Dinan  | H04L 1/1822 |
| 2018/0103460 | A1 | * | 4/2018 | Sharma | H04W 76/27  |
| 2018/0124648 | A1 | * | 5/2018 | Park   | H04W 36/0005 |
| 2018/0139734 | A1 | * | 5/2018 | Babaei | H04W 72/0406 |
| 2018/0279262 | A1 | * | 9/2018 | Babaei | H04L 1/00   |
| 2018/0288631 | A1 | * | 10/2018 | Wei   | H04W 24/02  |

(Continued)

OTHER PUBLICATIONS

Sharma et al., "Method and System for Handling Dedicated Semi Persistent Resources in Vehicle to Anything (V2X) Communication" IN201641034295A (Year: 2016).*

(Continued)

*Primary Examiner* — Un C Cho
*Assistant Examiner* — Yu-Wen Chang
(74) *Attorney, Agent, or Firm* — Skaar Ulbrich Macari, P.A.

(57) ABSTRACT

A method and apparatus are disclosed from the perspective of a network node. In one embodiment, the method includes receiving a resource request to allocate SPS resource from a UE, wherein the resource request indicates a first logical channel. The method also allocating the UE with a first SPS resource and a second SPS resource for the first logical channel and a second logical channel associated with the first logical channel based on the resource request.

19 Claims, 20 Drawing Sheets

(56) References Cited

U.S. PATENT DOCUMENTS

| | | | |
|---|---|---|---|
| 2019/0045521 A1* | 2/2019 | Hong | H04W 72/1205 |
| 2019/0230654 A1* | 7/2019 | Luo | H04W 4/40 |
| 2020/0007281 A1* | 1/2020 | Kilinc | H04W 36/0069 |
| 2020/0059821 A1* | 2/2020 | Wirth | H04L 1/1819 |
| 2020/0267753 A1* | 8/2020 | Adjakple | H04W 72/1226 |
| 2020/0304252 A1* | 9/2020 | Shim | H04L 5/0094 |
| 2022/0022249 A1* | 1/2022 | Kim | H04W 16/14 |

OTHER PUBLICATIONS

62417169,Appendix_to_the_Specification,Nov. 3, 2016 (Year: 2016).*
3GPP TSG-RAN WG2 Meeting #95 CATT, "UE Assistance Information for SPS Transmissions", 3GPP R2-164874, Gothenburg, Sweden, Aug. 22-26, 2016.
Office Action to the corresponding Chinese Patent Application rendered by the State Intellectual Property Office (SIPO) dated Feb. 2, 2021, 9 pages.
"Data duplication in lower layers (HARQ)"; Ericsson; 3GPP TSG-RAN WG2 #97: R2-1702032; Feb. 13-17, 2017, 5 pages.

* cited by examiner

METHOD AND APPARATUS OF REQUESTING SEMI-PERSISTENT SCHEDULING RESOURCE FOR TRANSMISSION OF DATA DUPLICATION IN A WIRELESS COMMUNICATION SYSTEM

CROSS-REFERENCE TO RELATED APPLICATIONS

The present Application claims the benefit of U.S. Provisional Patent Application Ser. No. 62/485,553 filed on Apr. 14, 2017, the entire disclosure of which is incorporated herein in its entirety by reference.

FIELD

This disclosure generally relates to wireless communication networks, and more particularly, to a method and apparatus of requesting semi-persistent scheduling resource for transmission of data duplication in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a network node. In one embodiment, the method includes receiving a resource request to allocate SPS (Semi-Persistent Scheduling) resource from a UE (User Equipment), wherein the resource request indicates a first logical channel. The method also allocating the UE with a first SPS resource and a second SPS resource for the first logical channel and a second logical channel associated with the first logical channel based on the resource request.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: R2-1701542, "Packet duplication in CA, RAN WG2 Meeting #97", LG; R2-1702032, "Data duplication in lower layers (HARM), RAN WG2 Meeting #97", Ericsson; 3GPP TR 38.913 V14.1.0, "Study on Scenarios and Requirements for Next Generation Access Technologies"; 3GPP TS 36.300 V14.1.0, "Evolved Universal Terrestrial Radio Access (E-UTRA) and Evolved Universal Terrestrial Radio Access Network (E-UTRAN); Overall description; Stage 2"; 3GPP TS 36.321 V14.0.0, "Evolved Universal Terrestrial Radio Access (E-UTRA); Medium Access Control (MAC) protocol specification"; TS 36.331 V14.1.0, "Evolved Universal Terrestrial Radio Access (E-UTRA); Radio Resource Control (RRC); Protocol specification". The standards and documents listed above are hereby expressly incorporated by reference in their entirety.

Figure 1:
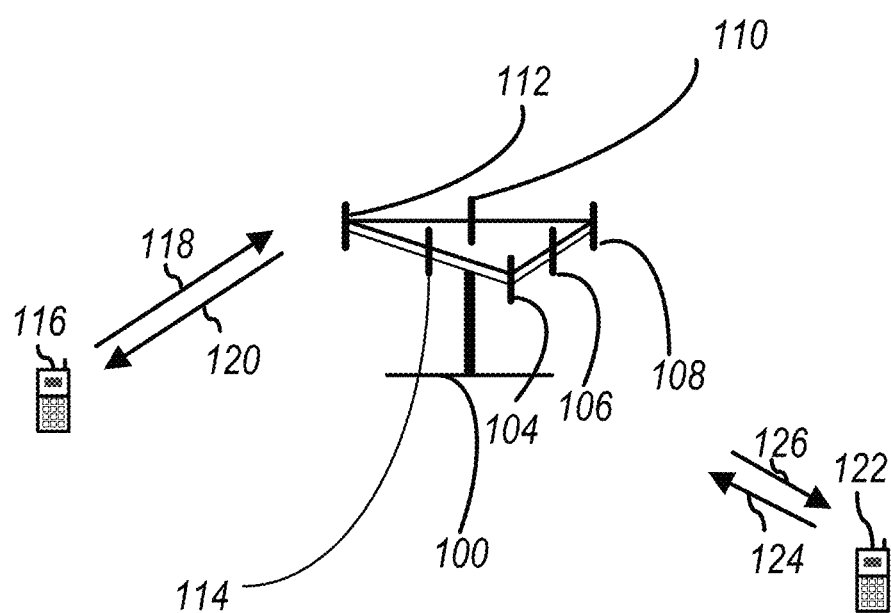
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
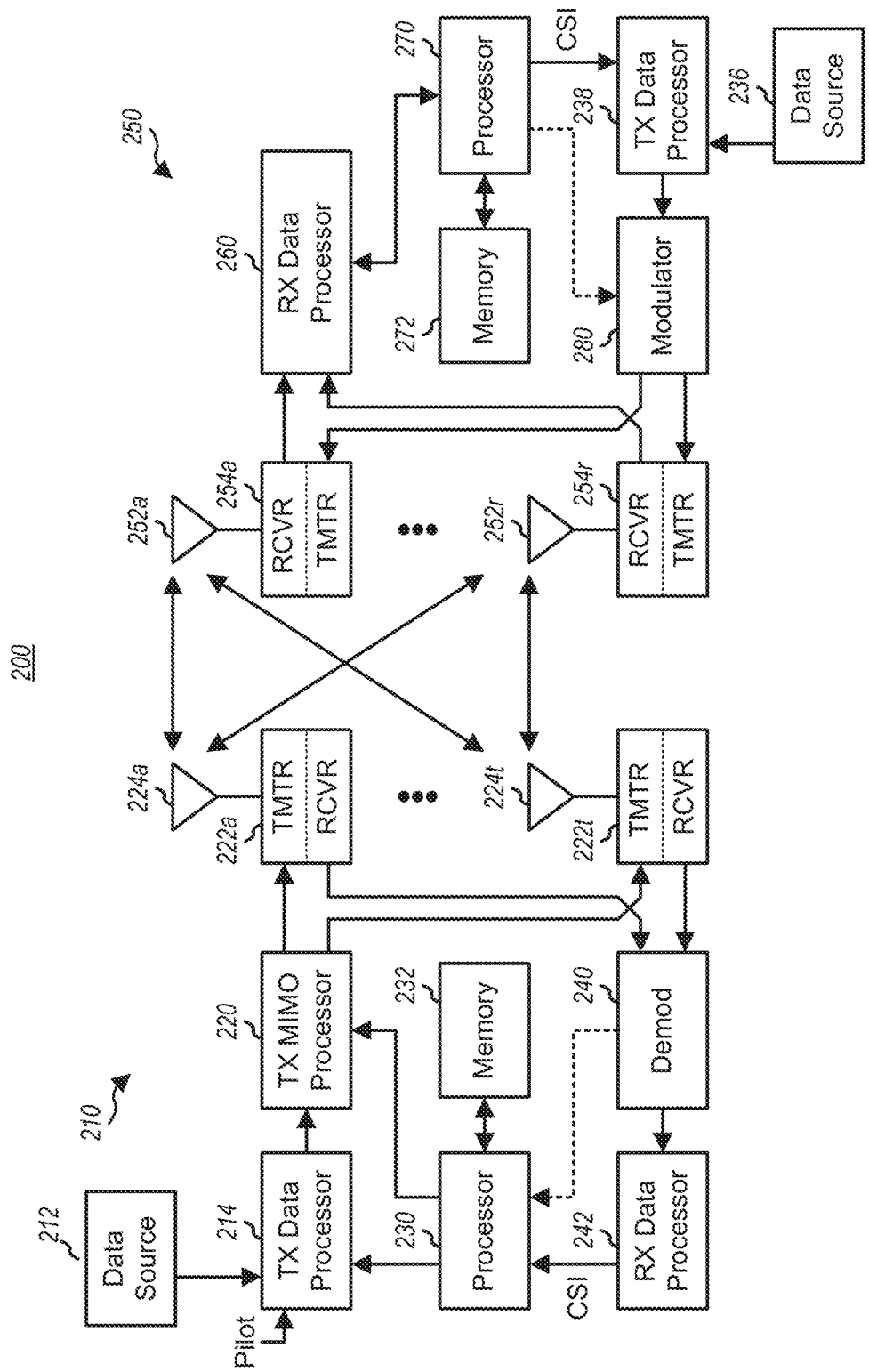
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g. BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g. for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g. amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g. filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
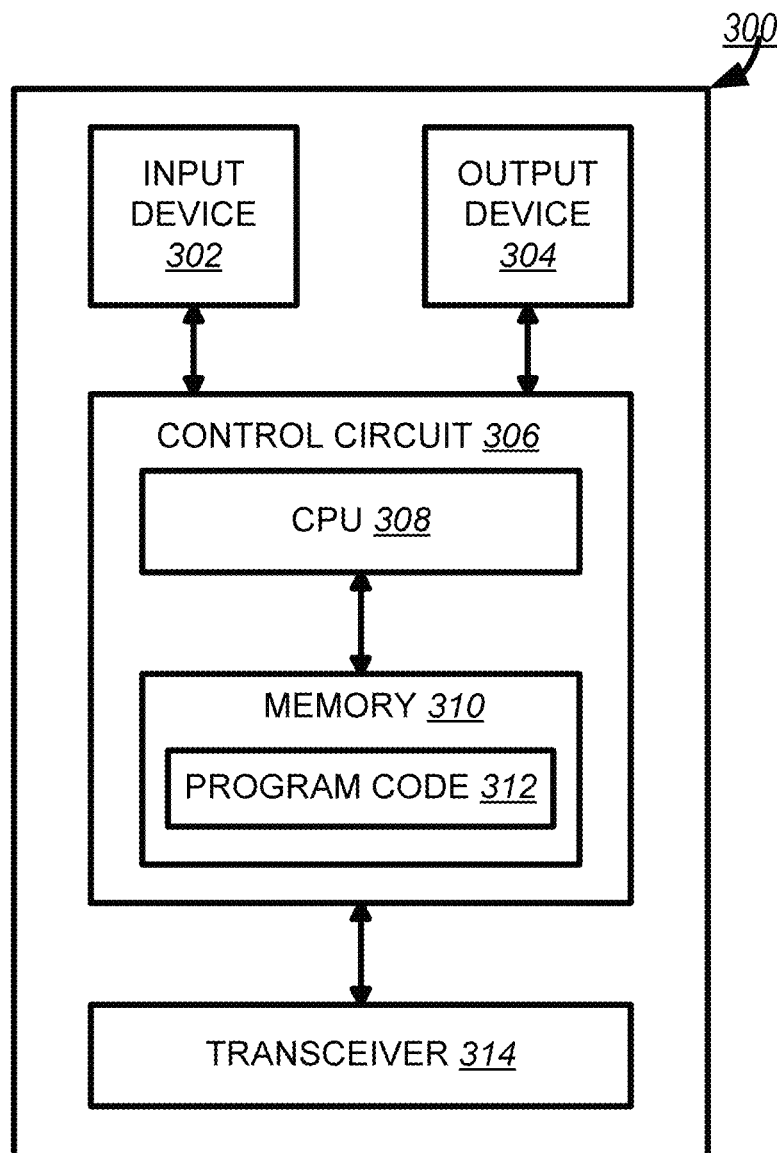
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
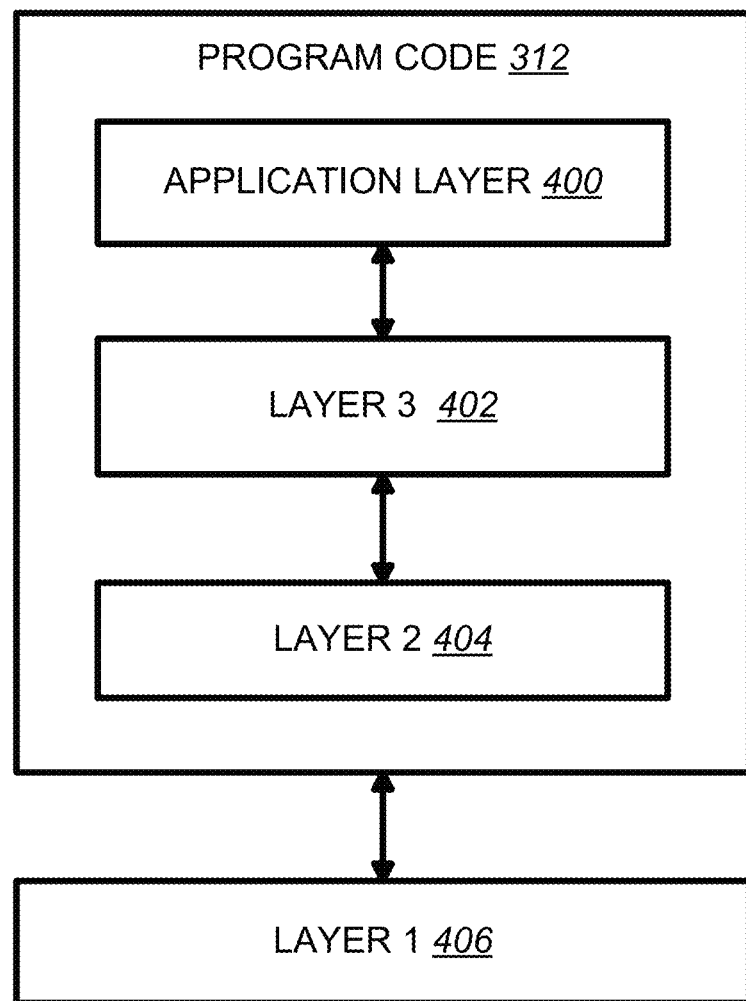
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP standardization activities on next generation (i.e. 5G) access technology have been launched since March 2015. The next generation access technology aims to support the following three families of usage scenarios for satisfying both the urgent market needs and the more long-term requirements set forth by the ITU-R IMT-2020:

eMBB (enhanced Mobile Broadband)
mMTC (massive Machine Type Communications)
URLLC (Ultra-Reliable and Low Latency Communications).

In general, an objective of the 5G study item on new radio access technology is to identify and develop technology components needed for new radio systems which should be able to use any spectrum band ranging at least up to 100 GHz. Supporting carrier frequencies up to 100 GHz brings a number of challenges in the area of radio propagation. As the carrier frequency increases, the path loss also increases.

As discussed in 3GPP R2-1701542, in LTE, erroneous data transmission has been guaranteed by ARQ (Automatic Repeat Request)/HARQ (Hybrid ARQ) in Layer2 and Adaptive Modulation and Coding (AMC) in Layer 1 while latency generally relies on eNB scheduling. Considering that AMC in Layer1 is tightly related to channel quality of the data path, i.e., one cell, what Layer 2 can do more would be to offer a chance to use multiple data paths, i.e., multiple cells, effectively by using carrier aggregation (CA) or dual connectivity (DC).

As discussed in 3GPP R2-1702032, in NR (New RAT), multi-connectivity (MC) can include terminologies of dual-connectivity (DC), and carrier aggregation (CA) from a system architecture perspective.

Characteristically, MC can contribute to URLLC (Ultra-Reliable and Low Latency Communications) in at least two aspects:
i) boosting reliability without sacrificing latency-wise performance;
ii) removing the interruption time otherwise caused by mobility.

The general philosophy to emphasize is that MC (as a kind of diversity scheme) can obtain a large magnitude of gains in reliability and latency that any link-level diversity scheme by its own cannot achieve.

Both DL and UL MC may be of special interests to URLLC, though UL MC may have limiting factors, such as UE's power.

According to 3GPP TR 38.913, URLLC packet satisfies the following two requirements:
1. Reliability—Reliability can be evaluated by the success probability of transmitting X bytes within a certain delay, which is the time it takes to deliver a small data packet from the radio protocol layer 2/3 SDU ingress point to the radio protocol layer 2/3 SDU egress point of the radio interface, at a certain channel quality (e.g., coverage-edge).

A general URLLC reliability requirement for one transmission of a packet is $1-10^{-5}$ for 32 bytes with a user plane latency of 1 ms.
2. UP latency—The time it takes to successfully deliver an application layer packet/message from the radio protocol layer 2/3 SDU ingress point to the radio protocol layer 2/3 SDU egress point via the radio interface in both uplink and downlink directions, where neither device nor Base Station reception is restricted by DRX.

For URLLC the target for user plane latency should be 0.5 ms for UL, and 0.5 ms for DL. Furthermore, if possible, the latency should also be low enough to support the use of the next generation access technologies as a wireless transport technology that can be used within the next generation access architecture. The value above should be considered an average value and does not have an associated high reliability requirement.

As discussed in 3GPP TS 36.300, Layer 2 is split into the following sublayers: Medium Access Control (MAC), Radio Link Control (RLC) and Packet Data Convergence Protocol (PDCP).

Figure 5:
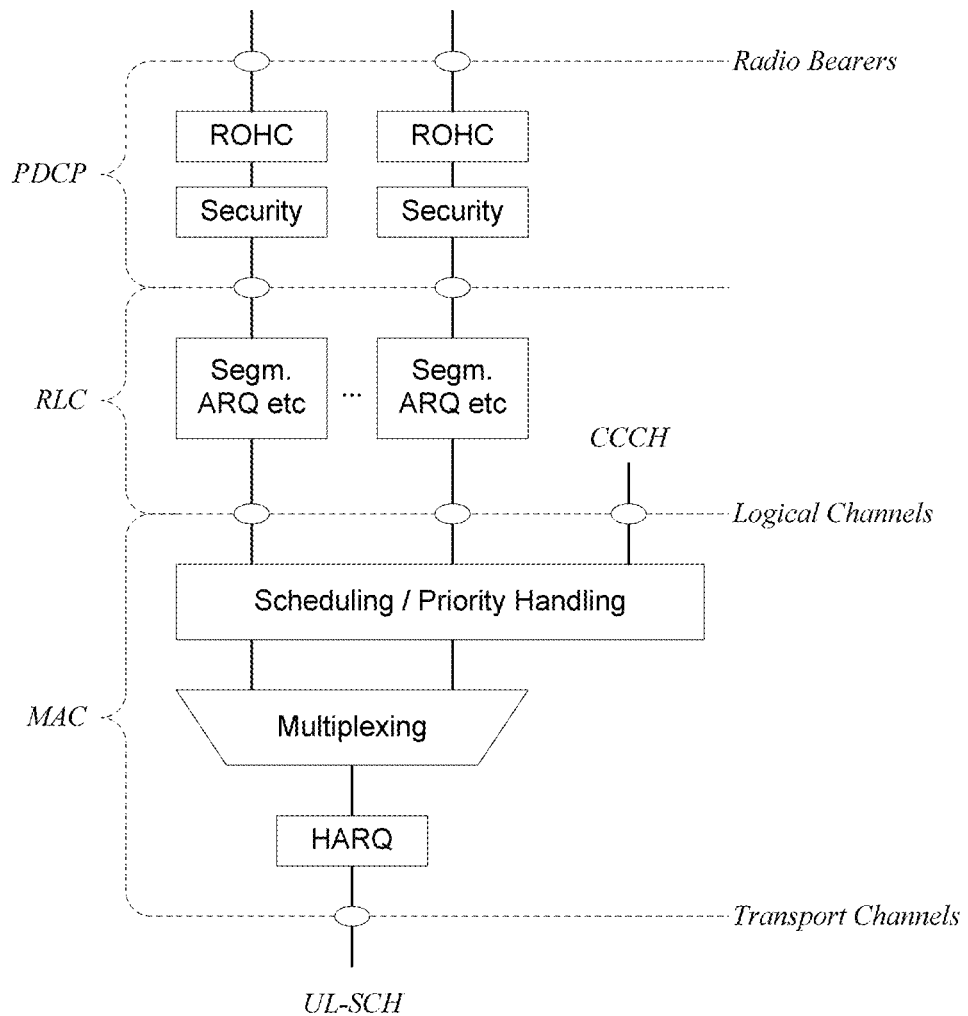
FIG. 5 is a reproduction of FIG. 6-2 of 3GPP TS 36.300 V14.1.0.

The multiplexing of several logical channels (i.e. radio bearers) on the same transport channel (i.e. transport block) is performed by the MAC sublayer;

In both uplink and downlink, when neither CA nor DC are configured, only one transport block is generated per TTI in the absence of spatial multiplexing;

FIG. 5 illustrates an exemplary Layer 2 structure for UL according to one embodiment.

Figure 6:
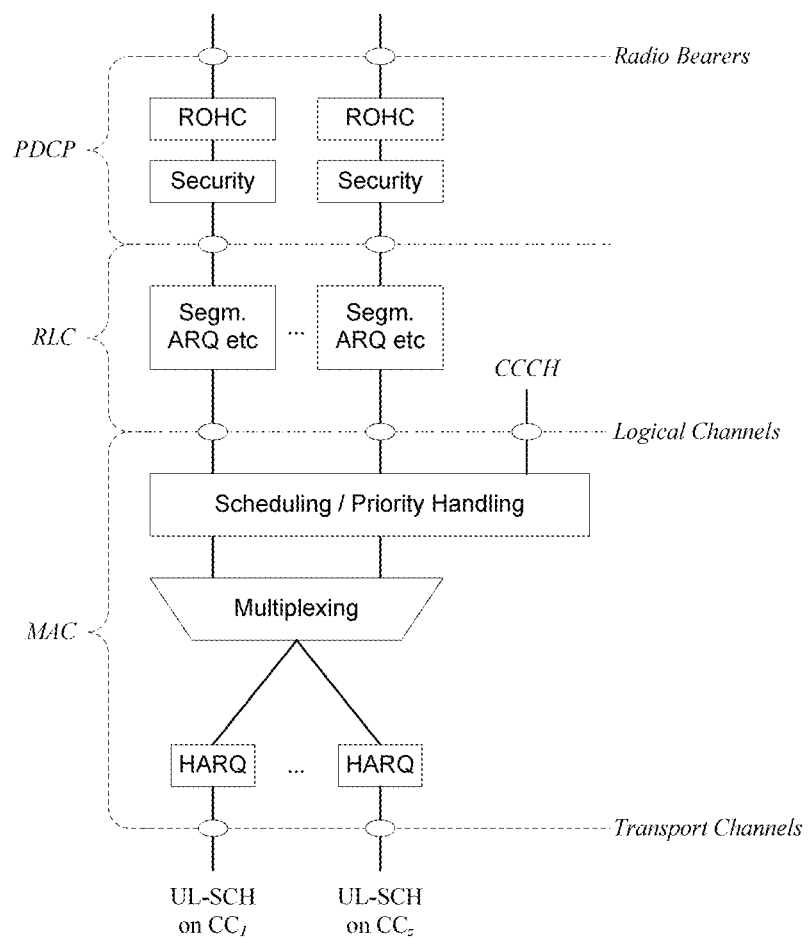
FIG. 6 is a reproduction of FIGS. 6.4-2 of 3GPP TS 36.300 V14.1.0.

In case of CA, the multi-carrier nature of the physical layer is only exposed to the MAC layer for which one HARQ entity is required per serving cell;

In both uplink and downlink, there is one independent hybrid-ARQ entity per serving cell and one transport block is generated per TTI per serving cell in the absence of spatial multiplexing. Each transport block and its potential HARQ retransmissions are mapped to a single serving cell;

FIG. 6 illustrates an exemplary Layer 2 Structure for UL with CA configured according to one embodiment.

In case of DC, the UE is configured with two MAC entities: one MAC entity for MeNB and one MAC entity for SeNB.

Figure 7:
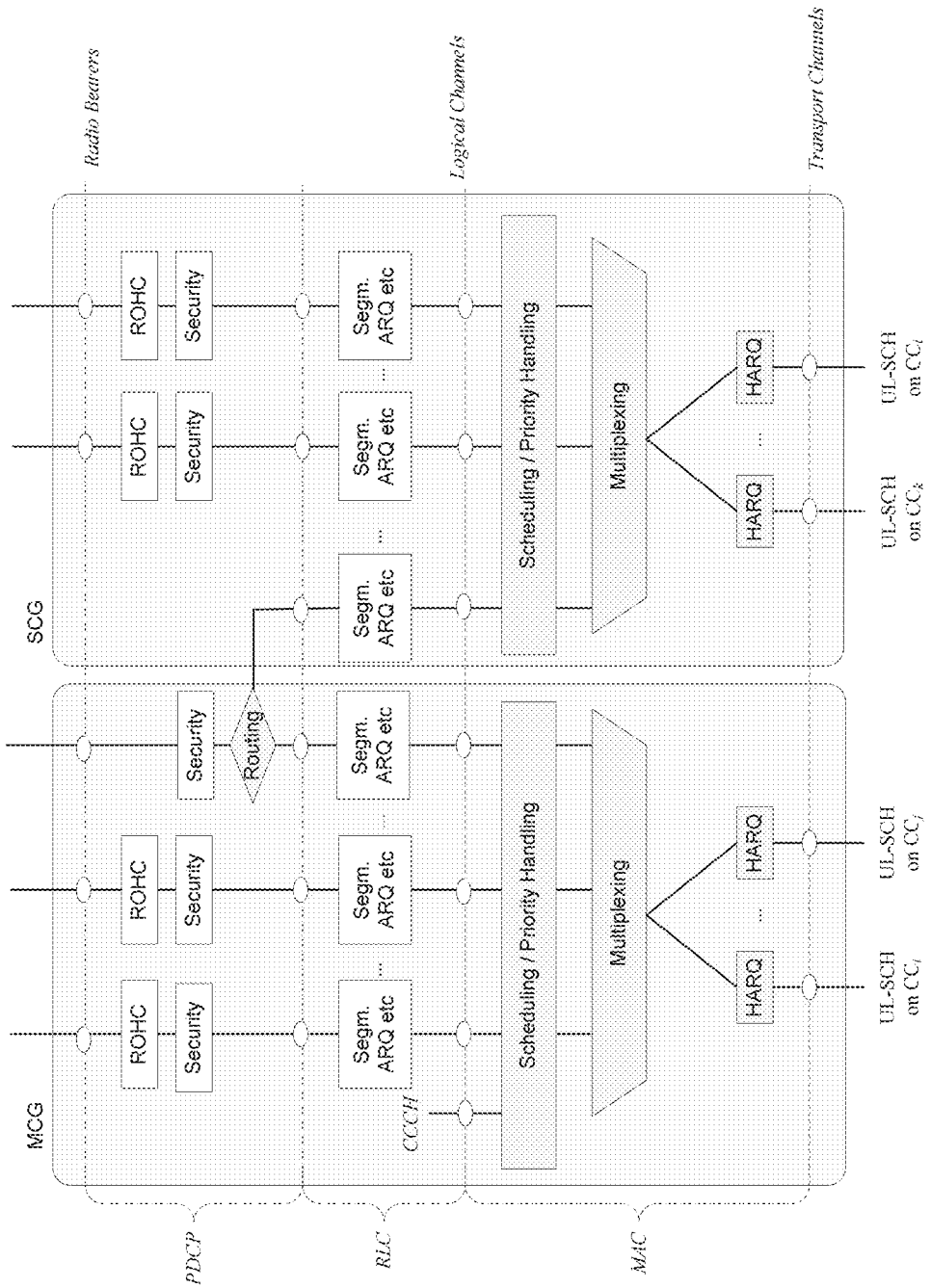
FIG. 7 is a reproduction of FIGS. 6.5-2 of 3GPP TS 36.300 V14.1.0.

FIG. 7 illustrates the exemplary layer 2 structure for the uplink when both CA and DC are configured in according to one embodiment. As explained in Section 4.9.2 of 3GPP TS 36.300, SRBs (Signaling Radio Bearer) are always handled by the MeNB, and as a result, CCCH (Common Control Channel) is only shown for the MeNB (Master evolved Node B). For a split bearer, UE is configured over which link (or both) the UE transmits UL PDCP (Packet Data Converge Protocol) PDUs (Packet Data Unit) by the MeNB. On the link which is not responsible for UL PDCP PDUs transmission, the RLC (Radio Link Control) layer only transmits corresponding ARQ feedback for the downlink data.

Logical channel prioritization (LCP) procedure and multiplexing of MAC control element and MAC SDUs are depicted in 3GPP TS 36.321 as follows:
5.4.3 Multiplexing and Assembly
5.4.3.1 Logical Channel Prioritization
The Logical Channel Prioritization procedure is applied when a new transmission is performed.
RRC controls the scheduling of uplink data by signalling for each logical channel: priority where an increasing priority value indicates a lower priority level, prioritisedBitRate which sets the Prioritized Bit Rate (PBR), bucketSizeDuration which sets the Bucket Size Duration (BSD). For NB-IoT, prioritisedBitRate, bucketSizeDuration and the corresponding steps of the Logical Channel Prioritisation procedure (i.e., Step 1 and Step 2 below) are not applicable. The MAC entity shall maintain a variable Bj for each logical channel j. Bj shall be initialized to zero when the related logical channel is established, and incremented by the product PBR×TTI duration for each TTI, where PBR is Prioritized Bit Rate of logical channel j. However, the value of Bj can never exceed the bucket size and if the value of Bj is larger than the bucket size of logical channel j, it shall be set to the bucket size. The bucket size of a logical channel is equal to PBR×BSD, where PBR and BSD are configured by upper layers.

The MAC entity shall perform the following Logical Channel Prioritization procedure when a new transmission is performed:

The MAC entity shall allocate resources to the logical channels in the following steps:

Step 1: All the logical channels with Bj>0 are allocated resources in a decreasing priority order. If the PBR of a logical channel is set to "infinity", the MAC entity shall allocate resources for all the data that is available for transmission on the logical channel before meeting the PBR of the lower priority logical channel(s);

Step 2: the MAC entity shall decrement Bj by the total size of MAC SDUs served to logical channel j in Step 1;

NOTE: The value of Bj can be negative.

Step 3: if any resources remain, all the logical channels are served in a strict decreasing priority order (regardless of the value of Bj) until either the data for that logical channel or the UL grant is exhausted, whichever comes first. Logical channels configured with equal priority should be served equally.

The UE shall also follow the rules below during the scheduling procedures above:

the UE should not segment an RLC SDU (or partially transmitted SDU or retransmitted RLC PDU) if the whole SDU (or partially transmitted SDU or retransmitted RLC PDU) fits into the remaining resources of the associated MAC entity;

if the UE segments an RLC SDU from the logical channel, it shall maximize the size of the segment to fill the grant of the associated MAC entity as much as possible;

the UE should maximise the transmission of data.

if the MAC entity is given an UL grant size that is equal to or larger than 4 bytes while having data available for transmission, the MAC entity shall not transmit only padding BSR and/or padding (unless the UL grant size is less than 7 bytes and an AMD PDU segment needs to be transmitted);

for transmissions on serving cells operating according to Frame Structure Type 3, the MAC entity shall only consider logical channels for which laa-Allowed has been configured.

The MAC entity shall not transmit data for a logical channel corresponding to a radio bearer that is suspended (the conditions for when a radio bearer is considered suspended are defined in [8]).

If the MAC PDU includes only the MAC CE for padding BSR or periodic BSR with zero MAC SDUs and there is no aperiodic CSI requested for this TTI [2], the MAC entity shall not generate a MAC PDU for the HARQ entity in the following cases:

in case the MAC entity is configured with skipUplinkTxDynamic and the grant indicated to the HARQ entity was addressed to a C-RNTI; or in case the MAC entity is configured with skipUplinkTxSPS and the grant indicated to the HARQ entity is a configured uplink grant;

For the Logical Channel Prioritization procedure, the MAC entity shall take into account the following relative priority in decreasing order:

MAC control element for C-RNTI or data from UL-CCCH;

MAC control element for SPS confirmation;

MAC control element for BSR, with exception of BSR included for padding;

MAC control element for PHR, Extended PHR, or Dual Connectivity PHR;

MAC control element for Sidelink BSR, with exception of Sidelink BSR included for padding;

data from any Logical Channel, except data from UL-CCCH;

MAC control element for BSR included for padding;

MAC control element for Sidelink BSR included for padding.

NOTE: When the MAC entity is requested to transmit multiple MAC PDUs in one TTI, steps 1 to 3 and the associated rules may be applied either to each grant independently or to the sum of the capacities of the grants. Also the order in which the grants are processed is left up to UE implementation. It is up to the UE implementation to decide in which MAC PDU a MAC control element is included when MAC entity is requested to transmit multiple MAC PDUs in one TTI. When the UE is requested to generate MAC PDU(s) in two MAC entities in one TTI, it is up to UE implementation in which order the grants are processed.

5.4.3.2 Multiplexing of MAC Control Elements and MAC SDUs

The MAC entity shall multiplex MAC control elements and MAC SDUs in a MAC PDU according to subclauses 5.4.3.1 and 6.1.2.

UE assistance information used to request SPS (Semi-Persistent Scheduling) resource for V2X (Vehicle-to-Everything) services is specified in 3GPP TS 36.331 as follows:

5.6.10 UE Assistance Information 5.6.10.1 General

Figure 8:
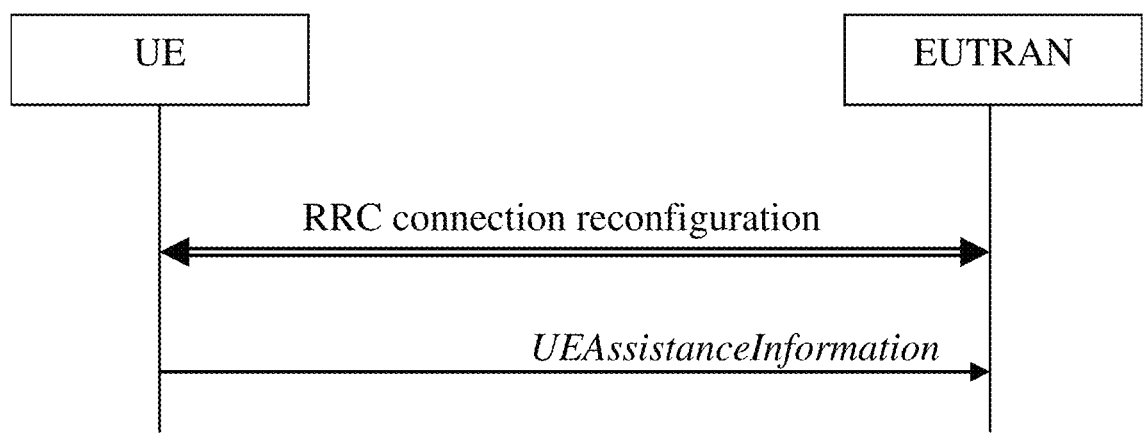
FIG. 8 is a reproduction of FIG. 5.6.10.1-1 of 3GPP TS 36.331 V14.1.0.

FIG. 5.6.10.1-1 of 3GPP TS 36.331 V14.1.0, Entitled "UE Assistance Information" is Reproduced as FIG. 8

The purpose of this procedure is to inform E-UTRAN of the UE's power saving preference and SPS assistance information, or maximum PDSCH/PUSCH bandwidth configuration preference. Upon configuring the UE to provide power preference indications E-UTRAN may consider that the UE does not prefer a configuration primarily optimised for power saving until the UE explictly indicates otherwise.

5.6.10.2 Initiation

A UE capable of providing power preference indications in RRC_CONNECTED may initiate the procedure in several cases including upon being configured to provide power preference indications and upon change of power preference. A UE capable of providing SPS assistance information in RRC_CONNECTED may initiate the procedure in several cases including upon being configured to provide SPS assistance information and upon change of SPS assistance information.

A UE capable of CE mode and providing maximum PDSCH/PUSCH bandwidth preference in RRC_CONNECTED may initiate the procedure upon being configured to provide maximum PDSCH/PUSCH bandwidth preference and/or upon change of maximum PDSCH/PUSCH bandwidth preference.

Upon initiating the procedure, the UE shall:
1> if configured to provide power preference indications:
  2> if the UE did not transmit a UEAssistanceInformation message with powerPrefIndication since it was configured to provide power preference indications; or
  2> if the current power preference is different from the one indicated in the last transmission of the UEAssistanceInformation message and timer T340 is not running:
    3> initiate transmission of the UEAssistanceInformation message in accordance with 5.6.10.3;
1> if configured to provide maximum PDSCH/PUSCH bandwidth preference:
  2> if the UE did not transmit a UEAssistanceInformation message with bw-Preference since it was configured to provide maximum PDSCH/PUSCH bandwidth preference; or:
  2> if the current maximum PDSCH/PUSCH bandwidth preference is different from the one indicated in the last transmission of the UEAssistanceInformation message and timer T341 is not running;
    3> initiate transmission of the UEAssistanceInformation message in accordance with 5.6.10.3;
1> if configured to provide SPS assistance information:
  2> if the UE did not transmit a UEAssistanceInformation message with sps-AssistanceInformation since it was configured to provide SPS assistance information; or
  2> if the current SPS assistance information is different from the one indicated in the last transmission of the UEAssistanceInformation message:
    3> initiate transmission of the UEAssistanceInformation message in accordance with 5.6.10.3;

5.6.10.3 Actions Related to Transmission of UEAssistanceInformation Message

The UE shall set the contents of the UEAssistanceInformation message for power preference indications:
1> if configured to provide power preference indication and if the UE prefers a configuration primarily optimised for power saving:
  2> set powerPrefIndication to lowPowerConsumption;
1> else if configured to provide power preference indication:
  2> start or restart timer T340 with the timer value set to the powerPrefIndicationTimer;
  2> set powerPrefIndication to normal;
1> if configured to provide SPS assistance information:
  2> if there is any traffic for V2X sidelink communication which needs to report SPS assistance information:
    3> include trafficPatternInfoListSL in the UEAssistanceInformation message;
  2> if there is any traffic for uplink communication which needs to report SPS assistance information:
    3> include trafficPatternInfoListUL in the UEAssistanceInformation message;

The UE shall set the contents of the UEAssistanceInformation message for bandwidth preference indications:
1> start timer T341 with the timer value set to the bw-PreferenceIndicationTimer;
1> set bw-Preference to its preferred configuration;

The UE shall submit the UEAssistanceInformation message to lower layers for transmission.

NOTE 1: It is up to UE implementation when and how to trigger SPS assistance information.
NOTE 2: It is up to UE implementation to set the content of trafficPatternInfoListSL and trafficPatternInfoListUL.
NOTE 3: Traffic patterns for different Destination Layer 2 IDs are provided in different entries in trafficPatternInfoListSL.

UEAssistanceInformation

The UEAssistanceInformation message is used for the indication of UE assistance information to the eNB.

Signalling radio bearer: SRB1
RLC-SAP: AM
Logical channel: DCCH
Direction: UE to E-UTRAN UEAssistanceInformation Message

```
-- ASN1START
UEAssistanceInformation-r11 ::=                SEQUENCE {
    criticalExtensions                         CHOICE {
        c1                                     CHOICE {
            ueAssistanceInformation-r11              UEAssistanceInformation-r11-IEs,
            spare3 NULL, spare2 NULL, spare1 NULL
        },
        criticalExtensionsFuture               SEQUENCE { }
    }
}
UEAssistanceInformation-r11-IEs ::=            SEQUENCE {
    powerPrefIndication-r11                    ENUMERATED  {normal,
lowPowerConsumption} OPTIONAL,
    lateNonCriticalExtension                   OCTET STRING            OPTIONAL,
    nonCriticalExtension                       UEAssistanceInformation-v14xy-IEs
    OPTIONAL
}
UEAssistanceInformation-v14xy-IEs ::=          SEQUENCE {
    bw-Preference-r14                  BW-Preference-r14                OPTIONAL,
    sps-AssistanceInformation-r14          SPS-AssistanceInformation-r14
    OPTIONAL,
    nonCriticalExtension                       SEQUENCE { }            OPTIONAL
}
```

-continued

```
BW-Preference-r14 ::= SEQUENCE {
    dl-Preference-r14       ENUMERATED      {mhz1dot4, mhz5, mhz20, spare1}
      OPTIONAL,
    ul-Preference-r14       ENUMERATED      {mhz1dot4, mhz5, spare2, spare1}
      OPTIONAL
}
SPS-AssistanceInformation-r14 ::=         SEQUENCE {
    trafficPatternInfoListSL-r14          TrafficPatternInfoListSL-r14      OPTIONAL,
    trafficPatternInfoListUL-r14          TrafficPatternInfoListUL-r14      OPTIONAL
}
TrafficPatternInfoListSL-r14 ::= SEQUENCE (SIZE (1..maxTrafficPattern-r14))
  OF TrafficPatternInfo-r14
TrafficPatternInfoListUL-r14 ::= SEQUENCE (SIZE (1..maxTrafficPattern-r14))
  OF TrafficPatternInfo-r14
TrafficPatternInfo-r14 ::=       SEQUENCE {
    trafficPeriodicity-r14                ENUMERATED {
                                            sf20, sf50, sf100, sf200, sf300, sf400,
sf500,
                                            sf600, sf700, sf800, sf900, sf1000,
                                            spare4, spare3, spare2, spare1},
    timingOffset-r14                      INTEGER (0..10239),
    priorityInfoSL-r14                    SL-Priority-r13
      OPTIONAL,
    logicalChannelIdentityUL-r14          INTEGER (3..10)                   OPTIONAL,
    messageSize-r14                       BIT STRING (SIZE (6))
}
-- ASN1STOP
```

| UEAssistanceInformation field descriptions |
|---|
| dl-Preference |
| Indicates UE's preference on configuration of maximum PDSCH bandwidth. The value mhz1dot4 corresponds to CE mode usage in 1.4 MHz bandwidth, mhz 5 corresponds to CE mode usage in 5 MHz bandwidth, and mhz 20 corresponds to CE mode usage in 20 MHz bandwidth or normal coverage. |
| logicalChannelIdentityUL |
| Indicates the logical channel identity associated with the reported traffic pattern in the uplink logical channel. |
| messageSize |
| Indicates the maximum TB size based on the observed traffic pattern. |
| powerPrefIndication |
| Value lowPowerConsumption indicates the UE prefers a configuration that is primarily optimised for power saving. Otherwise the value is set to normal. |
| priorityInfoSL |
| Indicates the traffic priority (i.e., PPPP) associated with the reported traffic pattern for V2X sidelink communication. |
| sps-AssistanceInformation |
| Indicates the UE assistance information to assist E-UTRAN to configure SPS. |
| timingOffset |
| This field indicates the estimated timing for a packet arrival in a SL/UL logical channel. Specifically, the value indicates the timing offset with respect to subframe#0 of SFN#0 in milliseconds. |
| trafficPeriodicity |
| This field indicates the estimated data arrival periodicity in a SL/UL logical channel. Value sf20 corresponds to 20 ms, sf50 corresponds to 50 ms and so on. |
| trafficPatternInfoListSL |
| This field provides the traffic characteristics of sidelink logical channel(s) that are setup for V2X sidelink communication. |
| trafficPatternInfoListUL |
| This field provides the traffic characteristics of uplink logical channel(s). |

| UEAssistanceInformation field descriptions |
|---|
| ul-Preference |
| Indicates UE's preference on configuration of maximum PUSCH bandwidth. The value mhz1dot4 corresponds to CE mode usage in 1.4 MHz bandwidth, and mhz 5 corresponds to CE mode usage in 5 MHz bandwidth. |

SPS-Config  
The IE SPS-Config is used to specify the semi-persistent scheduling configuration.

SPS-Config Information Element

```
-- ASN1START
SPS-Config ::= SEQUENCE {
    semiPersistSchedC-RNTI           C-RNTI              OPTIONAL,         -- Need OR
    sps-ConfigDL                     SPS-ConfigDL        OPTIONAL,         -- Need ON
    sps-ConfigUL                     SPS-ConfigUL        OPTIONAL          -- Need ON
}
SPS-Config-v14xy ::=                 SEQUENCE {
    ul-V-SPS-RNTI-r14                    C-RNTI          OPTIONAL,         -- Need OR
    sl-V-SPS-RNTI-r14                    C-RNTI          OPTIONAL,         -- Need OR
    sps-ConfigUL-ToAddModList-r14            SPS-ConfigUL-ToAddModList-r14
        OPTIONAL,           -- Need ON
    sps-ConfigUL-ToReleaseList-r14           SPS-ConfigUL-ToReleaseList-r14
        OPTIONAL,           -- Need ON
    sps-ConfigSL-ToAddModList-r14            SPS-ConfigSL-ToAddModList-r14
        OPTIONAL,           -- Need ON
    sps-ConfigSL-ToReleaseList-r14           SPS-ConfigSL-ToReleaseList-r14 OPTIONAL
        -- Need ON
}
SPS-ConfigUL-ToAddModList-r14 ::= SEQUENCE (SIZE (1..maxConfigSPS-r14)) OF SPS-ConfigUL
SPS-ConfigUL-ToReleaseList-r14 ::= SEQUENCE (SIZE (1..maxConfigSPS-r14)) OF SPS-ConfigIndex-r14
SPS-ConfigSL-ToAddModList-r14 ::= SEQUENCE (SIZE (1..maxConfigSPS-r14)) OF SPS-ConfigSL-r14
SPS-ConfigSL-ToReleaseList-r14 ::= SEQUENCE (SIZE (1..maxConfigSPS-r14)) OF SPS-ConfigIndex-r14
SPS-ConfigDL ::=                     CHOICE{
    release                              NULL,
    setup                                SEQUENCE {
        semiPersistSchedIntervalDL               ENUMERATED {
                                                     sf10, sf20, sf32, sf40, sf64, sf80,
                                                     sf128, sf160, sf320, sf640, spare6,
                                                     spare5, spare4, spare3, spare2,
                                                     spare1},
        numberOfConfSPS-Processes                INTEGER (1..8),
        n1PUCCH-AN-PersistentList                N1PUCCH-AN-PersistentList,
        ...,
        [[ twoAntennaPortActivated-r10           CHOICE {
                 release                             NULL,
                 setup                               SEQUENCE {
                     n1PUCCH-AN-PersistentListP1-r10 N1PUCCH-AN-PersistentList
                 }
             }                                                   OPTIONAL     -- Need
ON
        ]]
    }
}
SPS-ConfigUL ::=                     CHOICE {
    release                              NULL,
    setup                                SEQUENCE {
        semiPersistSchedIntervalUL               ENUMERATED {
                                                     sf10, sf20, sf32, sf40, sf64, sf80,
                                                     sf128, sf160, sf320, sf640, sf1-v14xy,
                                                     sf2-v14xy, sf3-v14xy, sf4-v14xy, sf5-
v14xy,
                                                     spare1},
        implicitReleaseAfter                     ENUMERATED {e2, e3, e4, e8},
        p0-Persistent                            SEQUENCE {
```

-continued

```
            p0-NominalPUSCH-Persistent          INTEGER (-126..24),
            p0-UE-PUSCH-Persistent              INTEGER (-8..7)
        }           OPTIONAL,                                           -- Need OP
        twoIntervalsConfig                      ENUMERATED {true}                       OPTIONAL, -- Cond TDD
        ...,
        [[ p0-PersistentSubframeSet2-r12        CHOICE {
                release                         NULL,
                setup                           SEQUENCE {
                        p0-NominalPUSCH-PersistentSubframeSet2-r12              INTEGER (-126..24),
                        p0-UE-PUSCH-PersistentSubframeSet2-r12                  INTEGER (-8..7)
                }
            }                                                   OPTIONAL               -- Need ON
        ]],
        [[ numberOfConfUlSPS-Processes-r13      INTEGER (1..8)                          OPTIONAL -- Need OR
        ]],
        [[ fixedRV-NonAdaptive-r14              ENUMERATED {true}       OPTIONAL, -- Need OR
            sps-ConfigIndex-r14                 SPS-ConfigIndex-r14                     OPTIONAL, -- Need OR
            semiPersistSchedIntervalUL-v14xy    ENUMERATED {
                                                sf50, sf100, sf200, sf300, sf400, sf500,
                                                sf600, sf700, sf800, sf900, sf1000,
                                                spare5, spare4, spare3, spare2, spare1} OPTIONAL -- Need OR
        ]]
    }
}
SPS-ConfigSL-r14 ::=            SEQUENCE {
    sps-ConfigIndex-r14                 SPS-ConfigIndex-r14 ,
    semiPersistSchedIntervalSL-r14      ENUMERATED {
                                        sf20, sf50, sf100, sf200, sf300, sf400,
                                        sf500, sf600, sf700, sf800, sf900, sf1000,
                                        spare4, spare3, spare2, spare1}
}
SPS-ConfigIndex-r14 ::=         INTEGER (1..maxConfigSPS-r14)
N1PUCCH-AN-PersistentList ::=   SEQUENCE (SIZE (1..4)) OF INTEGER (0..2047)
-- ASN1STOP
```

| SPS-Config field descriptions |
|---|
| implicitReleaseAfter |
| Number of empty transmissions before implicit release, see TS 36.321 [6, 5.10.2]. Value e2 corresponds to 2 transmissions, e3 corresponds to 3 transmissions and so on. If skipUplinkTxSPS is configured, the UE shall ignore this field. |
| n1PUCCH-AN-PersistentList, n1PUCCH-AN-PersistentListP1 |
| List of parameter: $n_{PUCCH}^{(1,p)}$ for antenna port P0 and for antenna port P1 respectively, see TS 36.213 [23, 10.1]. Field n1-PUCCH-AN-PersistentListP1 is applicable only if the twoAntennaPortActivatedPUCCH-Format1a1b in PUCCH-ConfigDedicated-v1020 is set to true. Otherwise the field is not configured. |
| numberOfConfSPS-Processes |
| The number of configured HARQ processes for downlink Semi-Persistent Scheduling, see TS 36.321 [6]. |
| numberOfConfUlSPS-Processes |
| The number of configured HARQ processes for uplink Semi-Persistent Scheduling, see TS 36.321 [6]. E-UTRAN always configures this field for asynchronous UL HARQ. Otherwise it does not configure this field. |
| p0-NominalPUSCH-Persistent |
| Parameter: $P_{O\_NOMINAL\_PUSH}$ (0). See TS 36.213 [23, 5.1.1.1], unit dBm step 1. This field is applicable for persistent scheduling, only. If choice setup is used and p0-Persistent is absent, apply the value of p0-NominalPUSCH for p0-NominalPUSCH-Persistent. If uplink power control subframe sets are configured by tpc-SubframeSet, this field applies for uplink power control subframe set 1. |

-continued

| SPS-Config field descriptions |
|---|
| p0-NominalPUSCH-PersistentSubframeSet2 |
| Parameter: $P_{O\_NOMINAL\_PUSCH}$ (0). See TS 36.213 [23, 5.1.1.1], unit dBm step 1. This field is applicable for persistent scheduling, only. If p0-PersistentSubframeSet2-r12 is not configured, apply the value of p0-NominalPUSCH-SubframeSet2-r12 for p0-NominalPUSCH-PersistentSubframeSet2. E-UTRAN configures this field only if uplink power control subframe sets are configured by tpc-SubframeSet, in which case this field applies for uplink power control subframe set 2.<br>p0-UE-PUSCH-Persistent |
| Parameter: $P_{O\_UE\_PUSCH}$ (0). See TS 36.213 [23, 5.1.1.1], unit dB. This field is applicable for persistent scheduling, only. If choice setup is used and p0-Persistent is absent, apply the value of p0-UE-PUSCH for p0-UE-PUSCH-Persistent. If uplink power control subframe sets are configured by tpc-SubframeSet, this field applies for uplink power control subframe set 1.<br>p0-UE-PUSCH-PersistentSubframeSet2 |
| Parameter: $P_{O\_UE\_PUSCH}$ (0). See TS 36.213 [23, 5.1.1.1], unit dB. This field is applicable for persistent scheduling, only. If p0-PersistentSubframeSet2-r12 is not configured, apply the value of p0-UE-PUSCH-SubframeSet2 for p0-UE-PUSCH-PersistentSubframeSet2. E-UTRAN configures this field only if uplink power control subframe sets are configured by tpc-SubframeSet, in which case this field applies for uplink power control subframe set 2.<br>semiPersistSchedC-RNTI |
| Semi-persistent Scheduling C-RNTI, see TS 36.321 [6].<br>semiPersistSchedIntervalDL |
| Semi-persistent scheduling interval in downlink, see TS 36.321 [6]. Value in number of sub-frames. Value sf10 corresponds to 10 sub-frames, sf20 corresponds to 20 sub-frames and so on. For TDD, the UE shall round this parameter down to the nearest integer (of 10 sub-frames), e.g. sf10 corresponds to 10 sub-frames, sf32 corresponds to 30 sub-frames, sf128 corresponds to 120 sub-frames.<br>semiPersistSchedIntervalUL |
| Semi-persistent scheduling interval in uplink, see TS 36.321 [6]. Value in number of sub-frames. Value sf10 corresponds to 10 sub-frames, sf20 corresponds to 20 sub-frames and so on. For TDD, when the configured Semi-persistent scheduling interval is greater than or equal to 10 sub-frames, the UE shall round this parameter down to the nearest integer (of 10 sub-frames), e.g. sf10 corresponds to 10 sub-frames, sf32 corresponds to 30 sub-frames, sf128 corresponds to 120 sub-frames.<br>semiPersistSchedIntervalSL |
| Semi-persistent scheduling interval in sidelink, see TS 36.321 [6]. Value in number of sub-frames. Value sf20 corresponds to 20 sub-frames, sf50 corresponds to 50 sub-frames and so on.<br>sps-ConfigIndex |
| Indicates the index of one of multiple SL/UL SPS configurations.<br>sps-ConfigSL-ToAddModList |
| Indicates the SL SPS configurations to be added or modified, identified by SPS-ConfigIndex.<br>sps-ConfigSL-ToReleaseList |
| Indicates the SL SPS configurations to be released, identified by SPS-ConfigIndex.<br>sps-ConfigUL-ToAddModList |
| Indicates the UL SPS configurations to be added or modified, identified by SPS-ConfigIndex.<br>sps-ConfigUL-ToReleaseList |
| Indicates the UL SPS configurations to be released, identified by SPS-ConfigIndex.<br>twoIntervalsConfig |
| Trigger of two-intervals-Semi-Persistent Scheduling in uplink. See TS 36.321 [6, 5.10]. If this field is present and the configured Semi-persistent scheduling interval greater than or equal to 10 sub-frames, two-intervals-SPS is enabled for uplink. Otherwise, two-intervals-SPS is disabled.<br>fixedRV-NonAdaptive |
| If this field is present and skipUplinkTxSPS is configured, non-adaptive retransmissions on configured uplink grant uses redundancy version 0, otherwise the redundancy version for each retransmission is updated based on the sequence of redundancy versions as described in TS 36.321 [6]. |

Terminology

The following terminology may be used hereafter.

TRP: A transmission and reception point provides network coverage and directly communicates with UEs. TRP could also be referred to as distributed unit (DU). A TRP may use one or multiple beams to serve each UE.

Cell: A cell is composed of one or multiple associated TRPs, i.e. coverage of the cell is composed of coverage of all associated TRP(s). One cell is controlled by one BS. Cell could also be referred to as TRP group (TRPG).

Original data: In data duplication, data would be duplicated to two equivalent (or the same) data, one is original data and the other is duplicate data. Original data is data which is not duplicated. Original data is used to duplicate. A logical channel used to transmit original data could be different from a logical channel used to transmit duplicate data. The cell(s), TRP(s), or beam(s) used to handle transmission of original data may be different from the cell(s), TRP(s), or beam(s) used to handle transmission of duplicate data.

Duplicate data: In mechanism of data duplication, data would be duplicated to two equivalent/same data, one is original data and the other is duplicate data. Duplicate data is data which is duplicated from original data. A logical channel used to transmit duplicate data could be different from a logical channel used to transmit original data. The cell(s), TRP(s), or beam(s) used to handle transmission of duplicate data may be different from the cell(s), TRP(s), or beam(s) used to handle transmission of original data.

Figure 9:
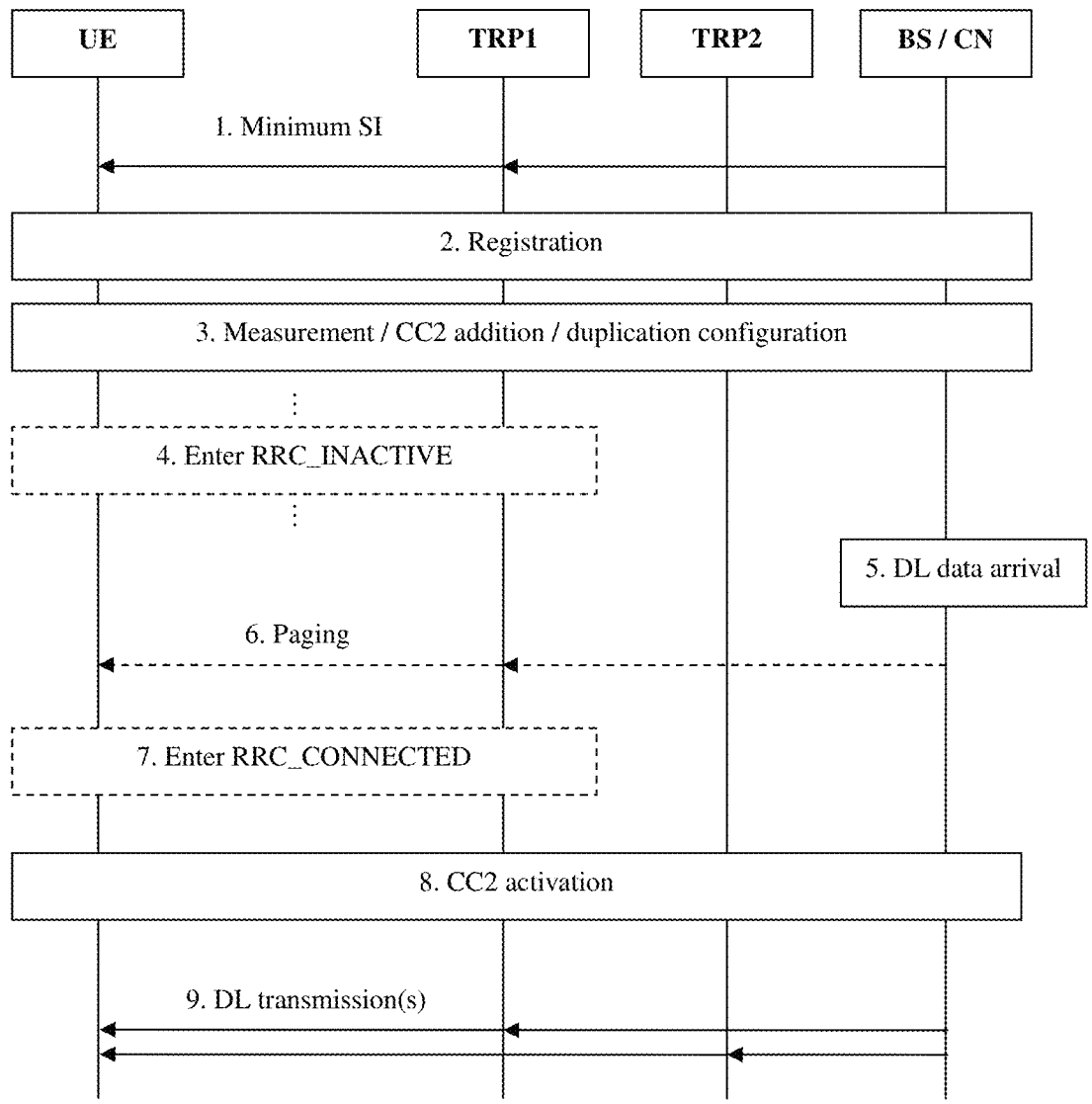
FIG. 9 is a flow chart according to one exemplary embodiment.

In one scenario, it is assumed that TRP 1 is controlled by a first cell and TRP 2 is controlled by a second cell. Both the first cell and the second cell are controlled by a BS. The first cell could be associated with a first component carrier (i.e. CC1). The second cell could be associated with a second component carrier (i.e. CC2). The service flow could be illustrated in FIG. 9 and described below:

Step 1. When UE is power on, it performs cell selection and then camps on a serving cell. The UE receives the Minimum SI from a BS of the serving cell. The serving cell could be a first cell controlled by the BS. The first cell is associated with component carrier #1 (CC1). The UE may receive the Minimum SI via TRP1. The TRP1 belongs to the first cell.

Step 2. The UE performs initial attach to the network and enters RRC_CONNECTED, and the related registration and authorization/authentication could be completed.

Step 3. The BS may configure the UE to measure a second cell. The UE may measure on the second cell and report result of measurement to the BS. Based on the measurement report, the BS may configure the UE with CC2. In addition, the BS may configure the UE with duplication configuration.

Step 4. The BS may send a RRC state change command to transit the UE from RRC_CONNECTED to RRC_INACTIVE, e.g. because the UE may not have any ongoing unicast services.

Step 5. The BS receives a data, which is to send to the UE, from core network e.g. S-GW.

Step 6. The BS may send a signalling to page the UE.

Step 7. The UE enters RRC_CONNECTED.

Step 8. The BS activates CC2 on the UE.

Step 9. The UE receives DL data via CC1 and CC2 from the BS. Retransmission of the DL data may occur on CC1 and/or CC2.

Figure 10:
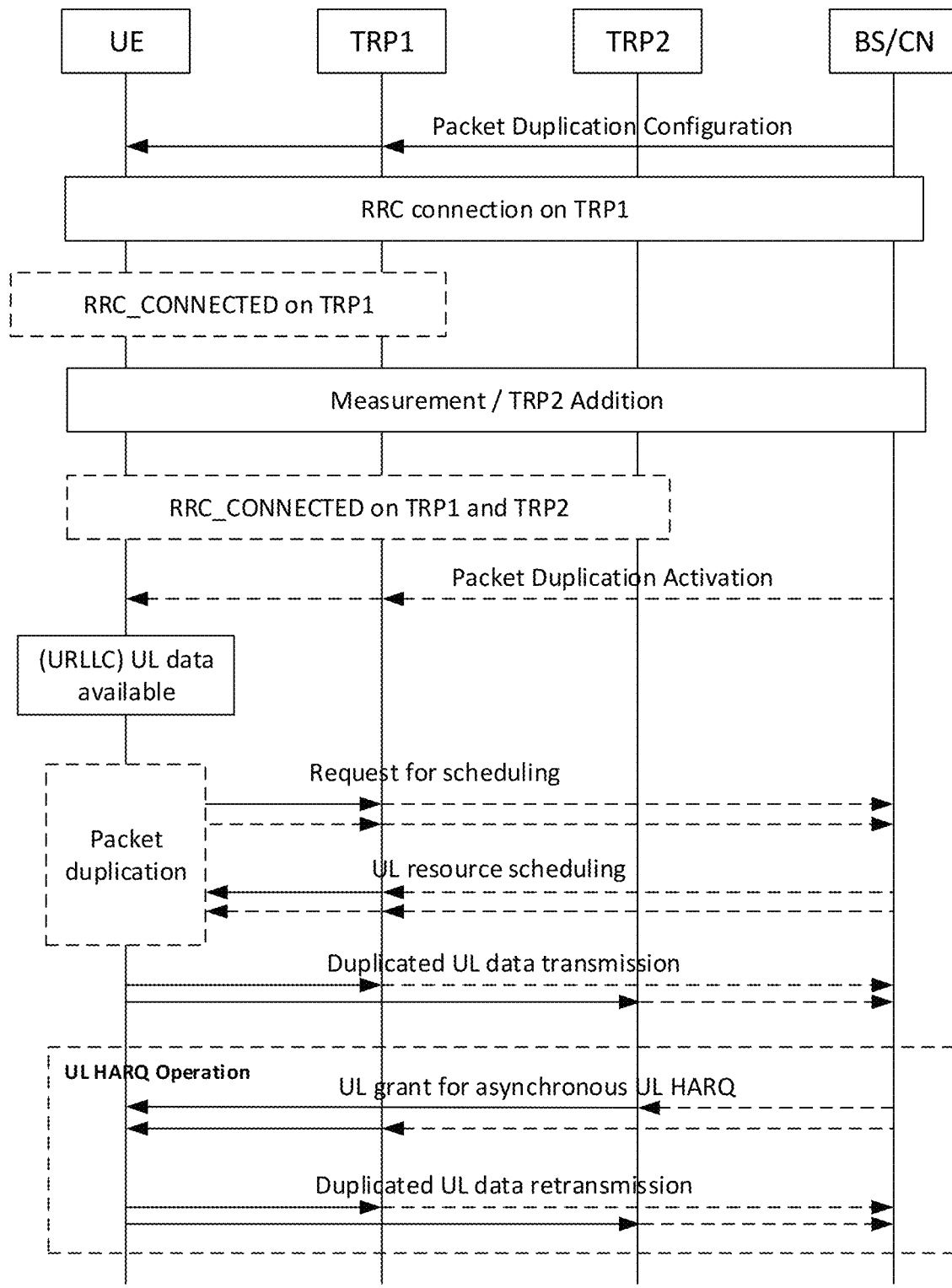
FIG. 10 is a low chart according to one exemplary embodiment.

In one scenario, it is assumed that TRP 1 is controlled by a first cell and TRP 2 is controlled by a second cell. Both the first cell and the second cell are controlled by a BS. The first cell could be associated with a first component carrier (i.e. CC1). The second cell could be associated with a second component carrier (i.e. CC2). The service flow could be illustrated in FIG. 10 and described below:

Packet Duplication Configuration

Packet duplication configuration could be transmitted in system information or be transmitted anytime via RRC signaling. Packet Duplication configuration may related to UE capability.

RRC Connection on TRP1

UE performs RACH procedure to attach TRP1 within the first cell, then enter RRC_CONNECTED state. It is assumed that the first cell is primary cell.

Measurement/TRP2 (CC2) Addition

For some conditions (e.g. UL/DL data transmission is overload or for packet duplication usage), TRP2 within the second cell would be added based on the measurement. The UE may perform RACH procedure to attach TRP2. And TRP2 is activated to be available for data transmission for the UE.

Packet Duplication Activation

Request for Scheduling

Basically, UE perform SR/BSR procedure to request UL resource.

UL Resource Scheduling

BS allocates UL resource for the UE, BS may transmit UL grant via one TRP or both TRPs.

Duplicated UL Data Transmission

UE transmits duplicated UL data to two TRPs.

UL HARQ Operation

NR may be only supported asynchronous HARQ operation in UL. If BS needs the UE to retransmit UL data, BS would transmit the UL grant for the UE.

Figure 11:
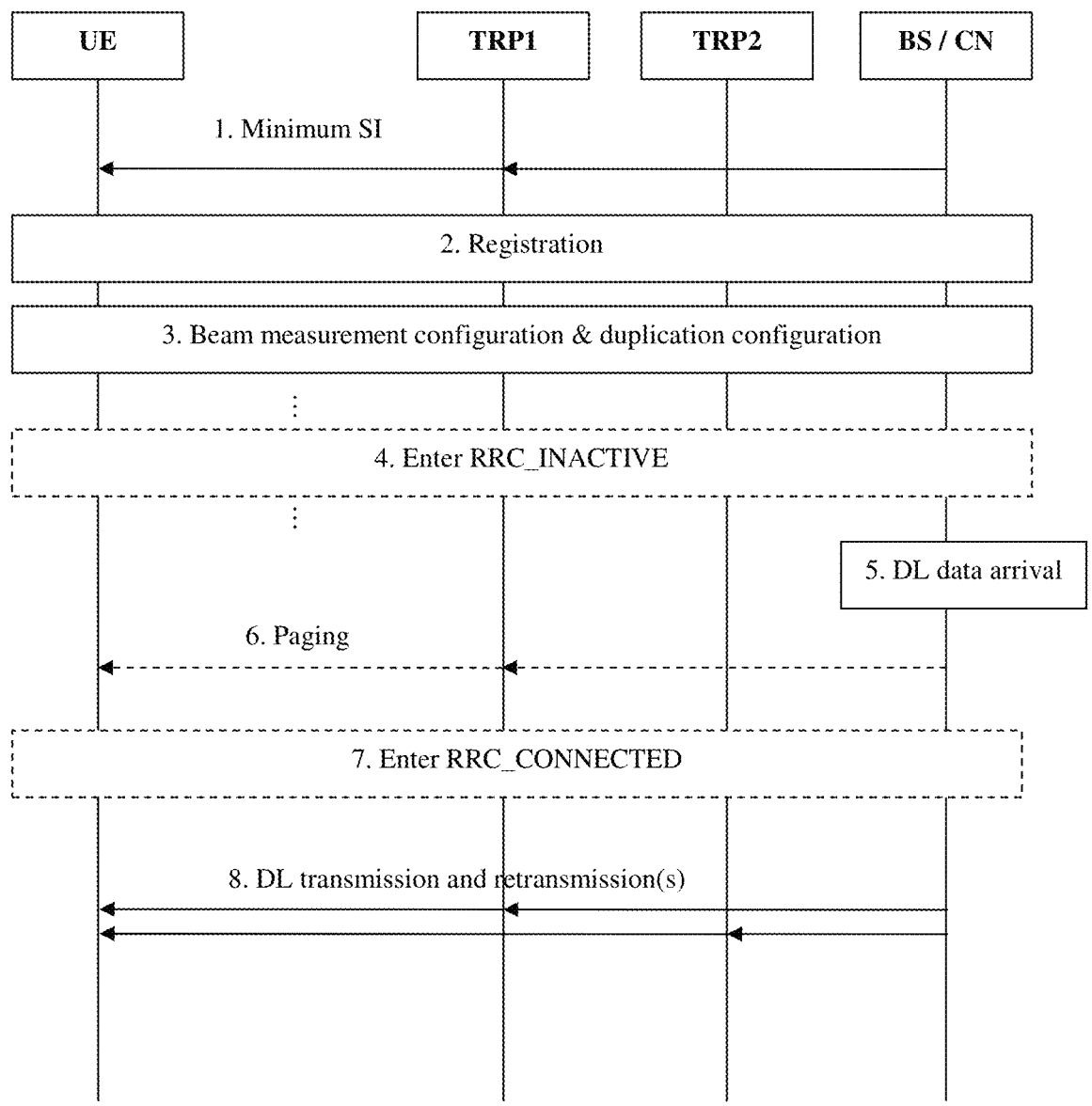
FIG. 11 is a flow chart according to one exemplary embodiment.

In one scenario, it is assumed that TRP 1 and TRP 2 belong to same cell. The cell is controlled by a BS. The UE may be served by one or multiple beams of the TRP 1. The UE may be served by one or multiple beams of the TRP 2. The service flow could be illustrated in FIG. 11 and described below:

Step 1. When UE is power on, it performs cell selection and then camps on a serving cell. The UE receives Minimum SI from a BS of the serving cell. The UE may receive the Minimum SI via TRP1. The TRP1 may or may not be transparent to the UE.

Step 2. The UE performs initial attach to the network based on the Minimum SI and enters RRC_CONNECTED, and the related registration and authorization/authentication could be completed. During the initial attach procedure, a default TRP beam of the TRP1 could be determined. During the initial attach procedure, a default UE beam could be determined.

Step 3. The BS may configure the UE to report beam measurement result. Based on the beam measurement report, the BS may consider to use both TRP1 and TRP2 to serve the UE. The BS may configure the UE to establish related data radio bearer, EPS bearer and/or logical channel. In addition, the BS may configure the UE with duplication configuration. Based on the duplication configuration, the UE establishes related logical channels for duplication reception.

Step 4. The BS may send a RRC state change command to transit the UE from RRC_CONNECTED to RRC_INACTIVE, e.g. because the UE may not have any ongoing unicast services temporarily.

Step 5. The BS receives a data, which is to send to the UE, from core network (e.g. S-GW).

Step 6. The BS may send a signalling to page the UE.

Step 7. The UE enters RRC_CONNECTED. The UE resumes the duplication configuration. The UE may perform beam measurement and may report beam measurement result to the BS. The BS may consider both TRP1 and TRP2 are still available on the UE.

Step 8. The UE receives DL data via any of beam(s) of the TRP1 and beam(s) of the TRP2 from the BS. Retransmission of the DL data may occur on any of beam(s) of the TRP1 and beam(s) of the TRP2.

Figure 12:
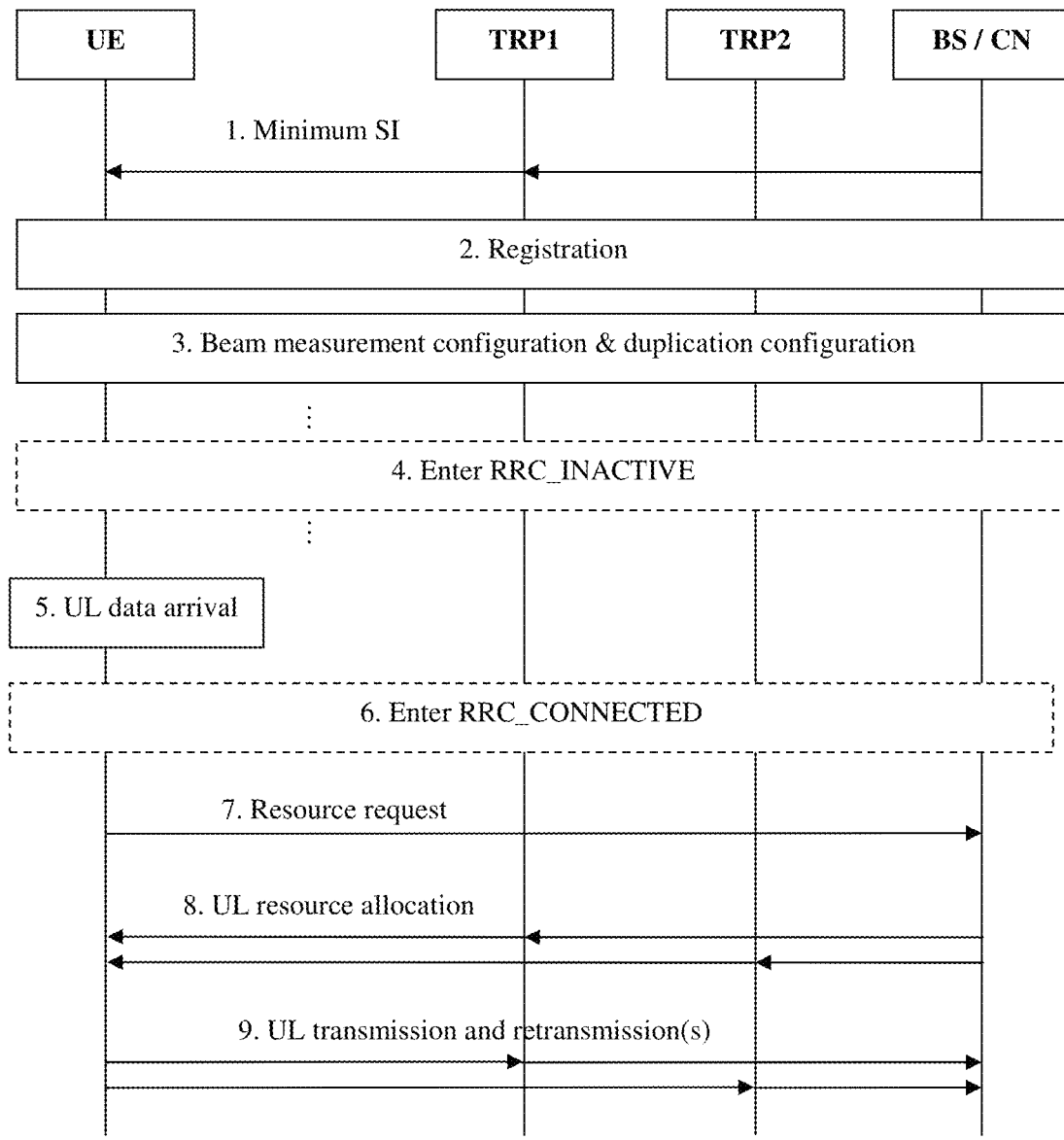
FIG. 12 is a flow chart according to one exemplary embodiment.

In one scenario, it is assumed that TRP 1 and TRP 2 belong to same cell. The cell is controlled by a BS. The UE may be served by one or multiple beams of the TRP 1. The UE may be served by one or multiple beams of the TRP 2. The service flow could be illustrated in FIG. 12 and described below:

Step 1. When UE is power on, it performs cell selection and then camps on a serving cell. The UE receives Minimum SI from a BS of the serving cell. The UE may receive the Minimum SI via TRP1. The TRP1 may or may not be transparent to the UE.

Step 2. The UE performs initial attach to the network based on the Minimum SI and enters RRC_CONNECTED, and the related registration and authorization/authentication could be completed. During the initial attach procedure, a default TRP beam of the TRP1 could be determined. During the initial attach procedure, a default UE beam could be determined.

Step 3. The BS may configure the UE to report beam measurement result. Based on the beam measurement report, the BS may consider using both TRP1 and TRP2 to serve the UE. The BS may configure the UE to establish related data radio bearer, EPS bearer and/or logical channel. In addition, the BS may configure the UE with duplication configuration. Based on the duplication configuration, the UE establishes related logical channels for duplication reception.

Step 4. The BS may send a RRC state change command to transit the UE from RRC_CONNECTED to RRC_INACTIVE, e.g. because the UE may not have any ongoing unicast services temporarily.

Step 5. The UE has data available for transmission.

Step 6. The UE may establish RRC connection with the BS. The UE enters RRC_CONNECTED. The UE resumes the duplication configuration. The UE may perform beam measurement and may report beam measurement result to the BS. The BS may consider both TRP1 and TRP2 are still available on the UE.

Step 7. The UE transmits resource request to the BS for allocating UL resources.

Step 8. The UE receives UL resources from the BS.

Step 9. The UE uses the UL resources to perform UL transmission. The UL transmission may be via any of beam(s) of the TRP1 and beam(s) of the TRP2 from the BS. Retransmission of UL data may occur on any of beam(s) of the TRP1 and beam(s) of the TRP2.

Figure 13:
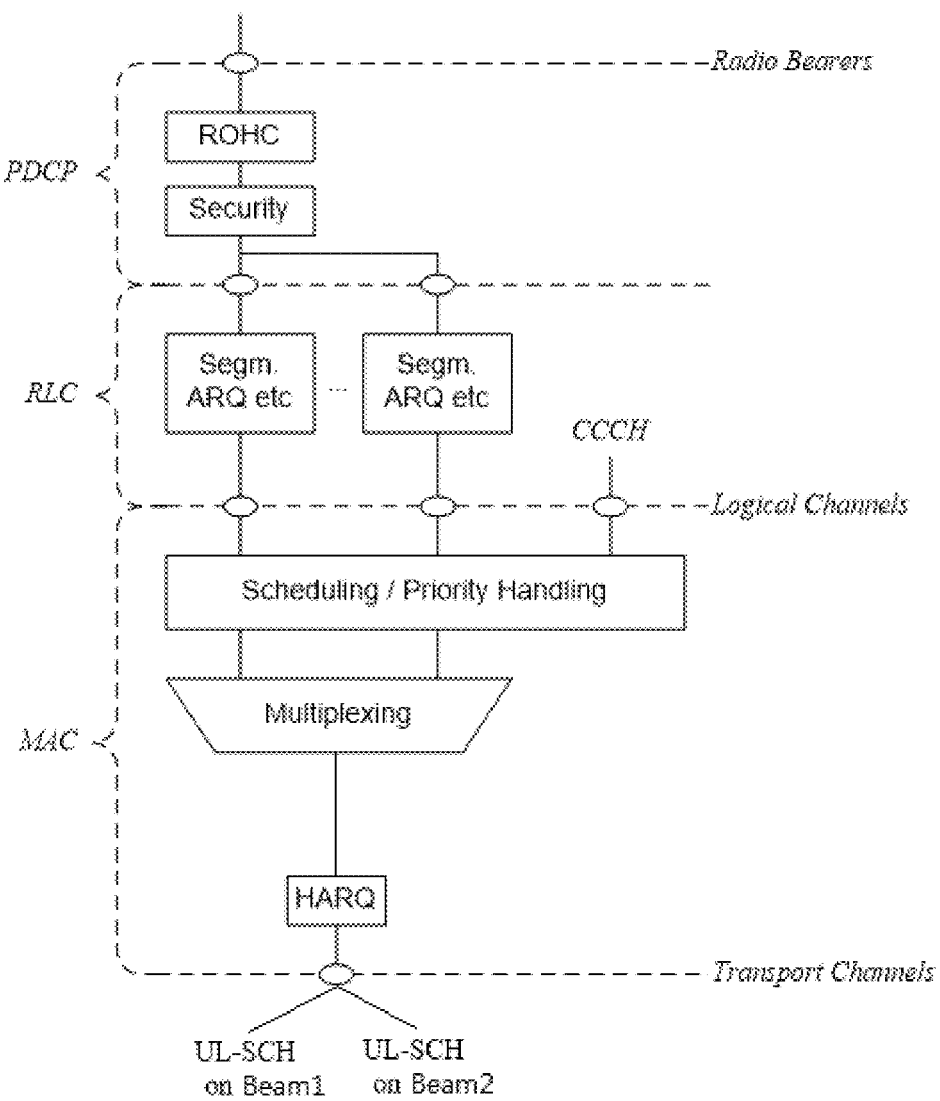
FIG. 13 is a flow chart according to one exemplary embodiment.
Figure 14:
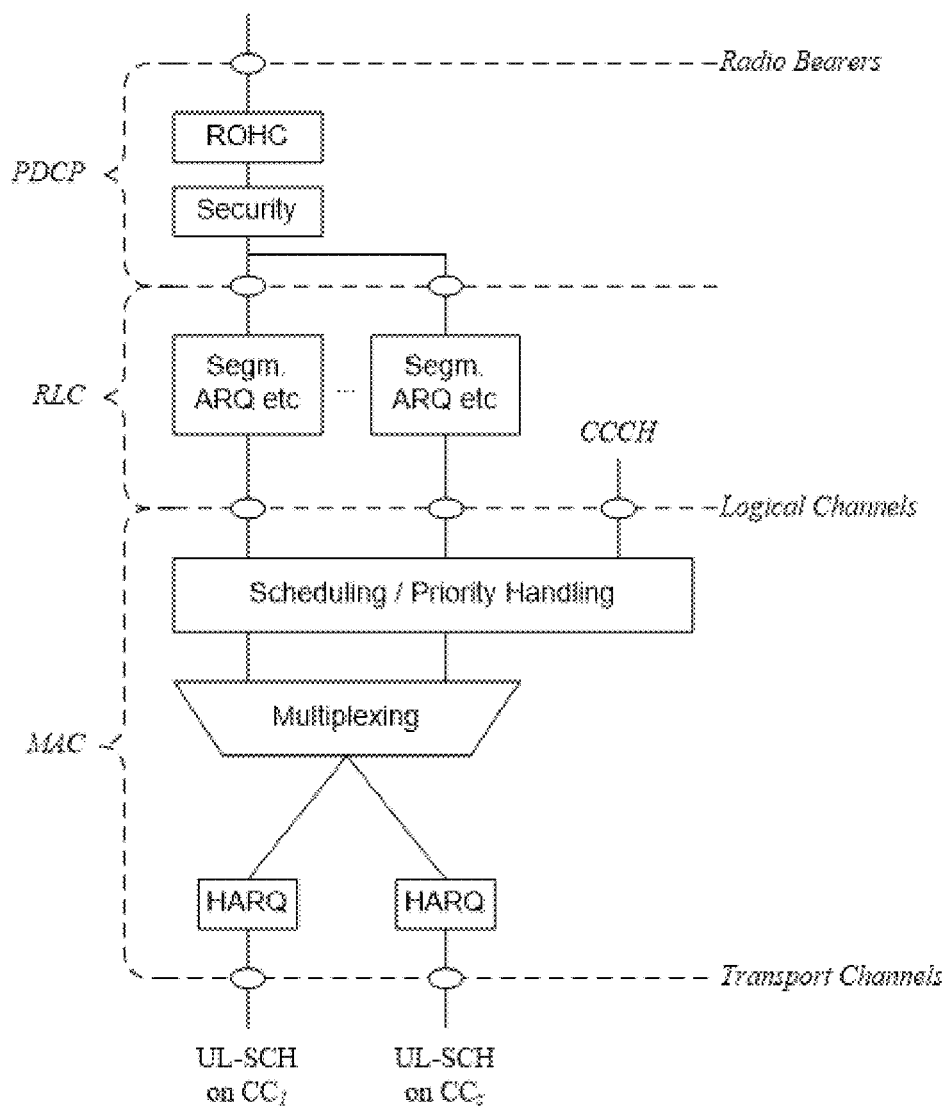
FIG. 14 is a flow chart according to one exemplary embodiment.

Duplicate data transmission via split radio bearer or logical channel and via different serving cells, TRPs, or beams may be supported to provide diversity gain and increase reliability. In NR system, a MAC entity may control transmission for different serving cells, TRPs, or beams. Examples of UE stack model for duplication transmission (via any of cell(s), CC(s), TRP(s), or beam(s) etc.) could be illustrated in FIGS. 13 and 14.

In order to reduce latency for transmission of duplicate data and reduce signaling overhead for allocating resources for the transmission, semi-persistent scheduling (SPS) could be considered in NR for the transmission of duplicate data. Methods to allocate SPS resource for transmission of duplicate data should be considered.

In Rel-14, UEs may send SPS assistance information to eNB for requesting SPS resources for V2X service(s), as discussed in 3GPP TS 36.331. In the SPS assistance information, preferred SPS interval, timing offset, or message size for the V2X service(s) may be reported per logical channel used to transmit the V2X service(s). It is assumed that the mechanism of SPS assistance information in Rel-14 could be reused in NR for transmission of duplicate data.

Since an UE (in NR) may establish two logical channels, one is for transmitting original data and the other is for transmitting duplicate data, the UE may report two sets of preferred SPS resource information in SPS assistance information, one set is for the logical channel of the original data and the other set is for the logical channel of the duplicate data. More specifically, content of the set of preferred SPS resource information for the logical channel of the original data may be same as content of the set of preferred SPS resource information for the logical channel of the duplicate data. Reporting the same content in SPS assistance information may cause signaling overhead and resource waste for requesting/allocating SPS resources for transmission of the original data and the duplicate data. The preferred SPS resource information may include, for example, SPS interval, SPS timing offset, or message size related to transmission of the original data and/or the duplicate data.

Figure 15:
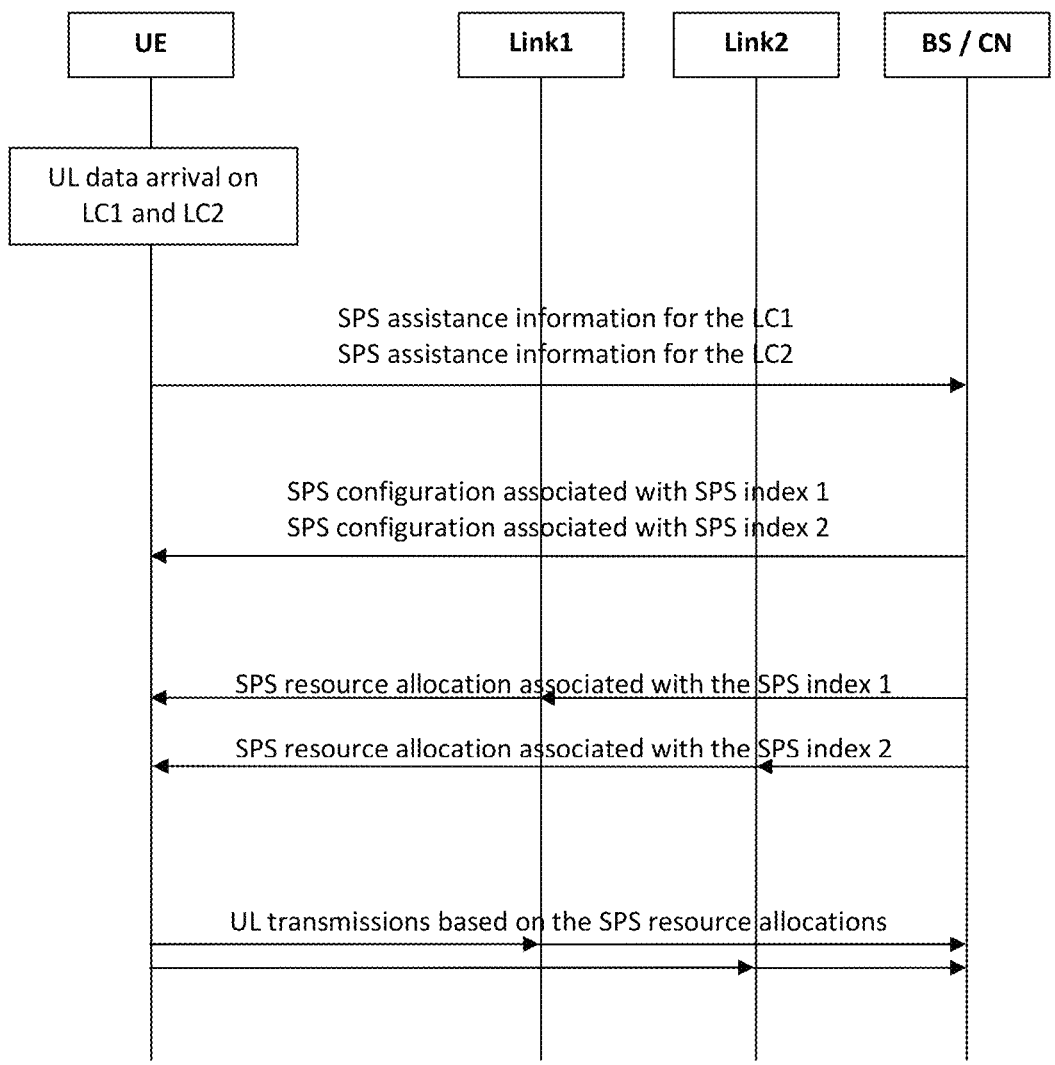
FIG. 15 is a flow chart according to one exemplary embodiment.

FIG. 15 illustrates an exemplary alternative embodiment. As shown in FIG. 15, after receiving the SPS assistance information including the two set of preferred SPS resource information, a gNB which serves the UE may configure the UE with two SPS configurations, each SPS configuration may be associated with one SPS configuration index. The gNB may use downlink control information (DCI) to indicate the UE which one SPS configuration should be activated with allocated SPS resources. The downlink control information may include field used to derive a SPS configuration index associated with the one SPS configuration.

The gNB may use same DCI or different DCIs to activate the two SPS configurations. Each DCI may be transmitted on one transmission path or communication link. The transmission path or communication link may be via a cell, a TRP, a serving beam, or a component carrier. More specifically, the transmission path or communication link may be a connection established between the UE and the gNB through a cell, a TRP, a serving beam, or a component carrier.

Figure 16:
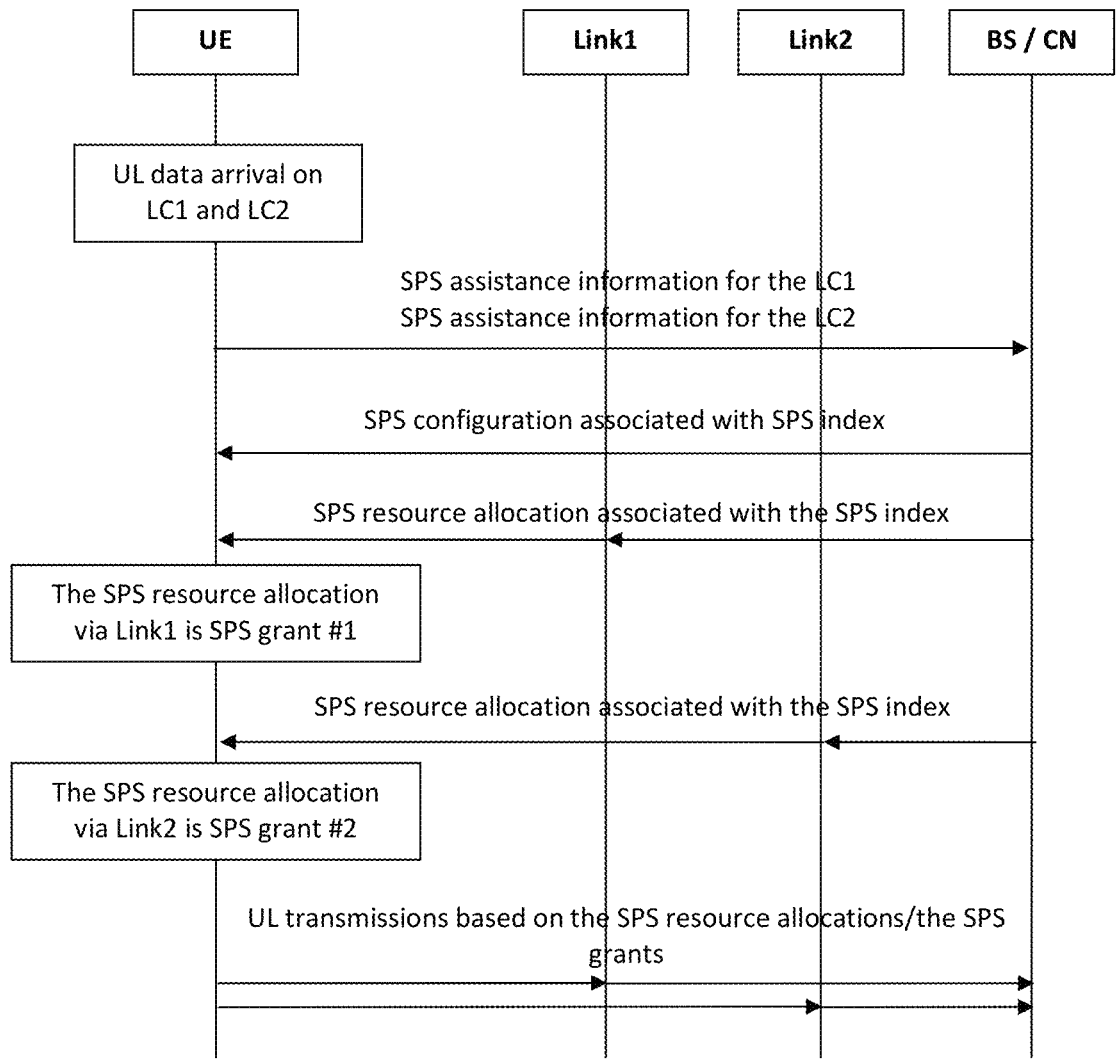
FIG. 16 is a flow chart according to one exemplary embodiment.

FIG. 16 shows an exemplary alternative embodiment. As shown in FIG. 16, since the logical channel of original data and the logical channel of duplicate data are used for transmission with same or similar traffic pattern (e.g. same or similar interval between packets, same or similar timing offset, same or similar packet size, etc.), the gNB would configure the single, same, or common SPS configuration for the both logical channels. In this embodiment, the UE may report two sets of preferred SPS resource information for the both logical channels in SPS assistance information.

After receiving the SPS assistance information including the two set of preferred SPS resource information, the gNB may configure the UE with single, same, or common SPS configuration for the two set of preferred SPS resource information. The SPS configuration could be associated with a SPS configuration index. The gNB may use downlink control information (DCI) to indicate the UE to activate the SPS configuration. The downlink control information may include field used to derive the SPS configuration index associated with the SPS configuration. The gNB may use different DCIs to activate the SPS configuration. Each DCI may be transmitted on one transmission path or communication link. The transmission path or communication link may be via a cell, a TRP, a serving beam, or a component carrier. More specifically, the transmission path or communication link may be a connection established between the UE and the gNB through a cell, a TRP, a serving beam, or a component carrier.

The UE (e.g. MAC entity) may learn the transmission path or communication link from physical layer of the UE. The UE could consider that there is a SPS grant corresponding to the SPS configuration on a transmission path or communication link if it receives SPS resource associated with the SPS configuration index through the transmission path or communication link. For example, there could be a first SPS grant corresponding to a SPS configuration on a first transmission path or communication link if the UE receives a SPS resource associated with a SPS configuration index associated with the SPS configuration through the first transmission path or communication link. Furthermore, there could be a second SPS grant corresponding to the SPS configuration on a second transmission path or communication link if the UE receives a SPS resource associated with the SPS configuration index through the second transmission path or communication link. The first SPS grant could be different from the second SPS grant. The UE may use the first SPS grant to serve the logical channel of original data and use the second SPS grant to serve the logical channel of duplicate data.

Figure 17:
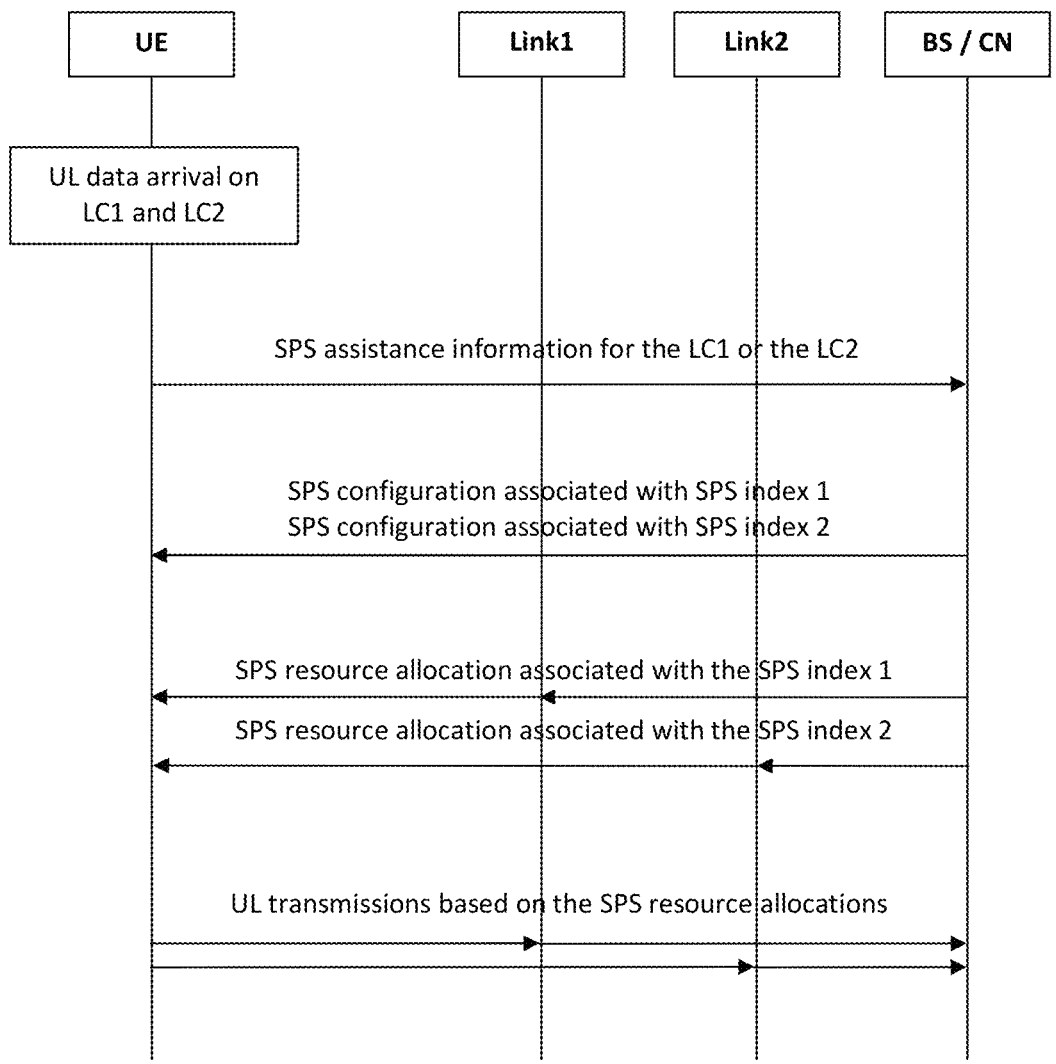
FIG. 17 is a flow chart according to one exemplary embodiment.

FIG. 17 illustrates an exemplary alternative embodiment. As shown in FIG. 17, since the logical channel of original data and the logical channel of duplicate data are used for transmission with same/similar traffic pattern (e.g. same or similar interval between packets, same or similar timing offset, same or similar packet size, etc.), one set of preferred SPS resource information included in SPS assistance information for requesting SPS resources to serve the both logical channels may be considered. In this embodiment, UE may report one set of preferred SPS resource information for either the logical channel of original data or the logical channel of duplicate data in SPS assistance information.

After receiving the SPS assistance information including the set of preferred SPS resource information, the gNB may configure the UE with two SPS configurations, each SPS configuration may be associated with one SPS configuration index. The gNB may use downlink control information (DCI) to indicate the UE which one SPS configuration should be activated with allocated SPS resources. The downlink control information may include field used to derive a SPS configuration index associated with the one SPS configuration. The gNB may use same DCI or different DCIs to activate the two SPS configurations. Each DCI may be transmitted on one transmission path or communication link. The transmission path or communication link may be via a cell, a TRP, a serving beam, or a component carrier. More specifically, the transmission path or communication link may be a connection established between the UE and the gNB through a cell, a TRP, a serving beam, or a component carrier.

The UE could consider that there is a SPS grant corresponding to a SPS configuration if it receives a SPS resource associated with a SPS configuration index associated with the SPS configuration. For example, there could be a first SPS grant corresponding to a first SPS configuration if the UE receives a SPS resource associated with a SPS configuration index associated with the first SPS configuration. Furthermore, there could be a second SPS grant corresponding to a second SPS configuration if the UE receives a SPS resource associated with a SPS configuration index associated with the second SPS configuration. The first SPS grant could be different from the second SPS grant. The UE may use the first SPS grant to serve the logical channel of original data and use the second SPS grant to serve the logical channel of duplicate data.

Figure 18:
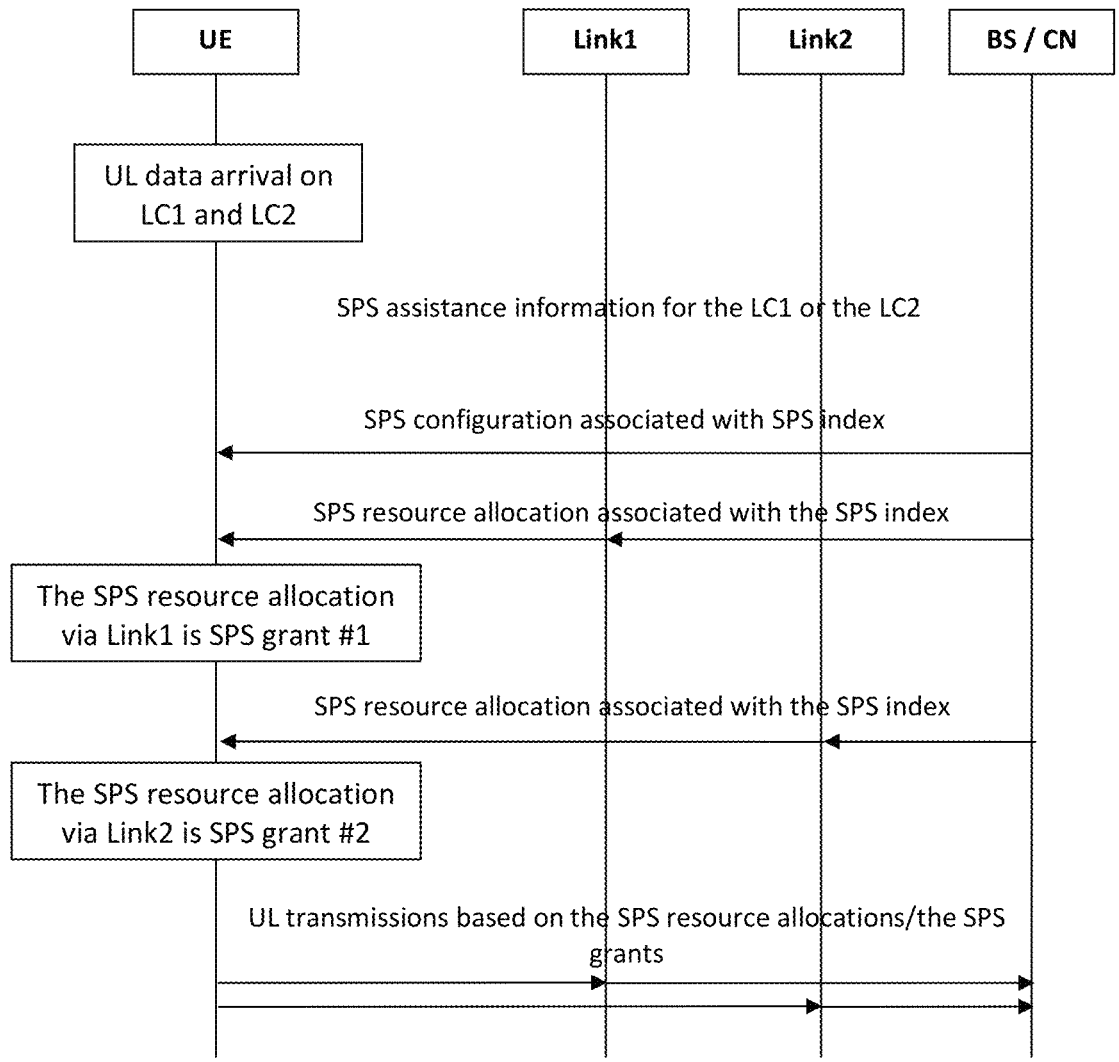
FIG. 18 is a flow chart according to one exemplary embodiment.

FIG. 18 illustrates an exemplary alternative embodiment. Possibly, since the logical channel of original data and the logical channel of duplicate data are used for transmission with same/similar traffic pattern (e.g. same or similar interval between packets, same or similar timing offset, same or similar packet size, etc.), one set of preferred SPS resource information included in SPS assistance information for requesting SPS resources to serve the both logical channels may be considered. In this embodiment, UE may report one set of preferred SPS resource information for either the logical channel of original data or the logical channel of duplicate data in SPS assistance information.

After receiving the SPS assistance information including the set of preferred SPS resource information, the gNB may configure the UE with single, same, or common SPS configuration for the set of preferred SPS resource information. The SPS configuration could be associated with a SPS configuration index. The gNB may use downlink control information (DCI) to indicate the UE to activate the SPS configuration. The downlink control information may include field used to derive the SPS configuration index associated with the SPS configuration. The gNB may use different DCIs to activate the SPS configuration on different transmission paths or communication links. Each DCI may be transmitted on one transmission path/communication link. The transmission path or communication link may be via a cell, a TRP, a serving beam, or a component carrier. More specifically, the transmission path or communication link may be a connection established between the UE and the gNB through a cell, a TRP, a serving beam, or a component carrier.

The UE (e.g. MAC entity) may learn the transmission path or communication link from physical layer of the UE. The UE could consider that there is a SPS grant corresponding to the SPS configuration on a transmission path or communication link if it receives SPS resource associated with the SPS configuration index through the transmission path or communication link. For example, there could be a first SPS grant corresponding to a SPS configuration on a first transmission path or communication link if the UE receives a SPS resource associated with a SPS configuration index associated with the SPS configuration through the first transmission path or communication link. Furthermore, there could be a second SPS grant corresponding to the SPS configuration on a second transmission path or communication link if the UE receives a SPS resource associated with the SPS configuration index through the second transmission path or communication link. The first SPS grant could be different from the second SPS grant. The UE may use the first SPS grant to serve the logical channel of original data and use the second SPS grant to serve the logical channel of duplicate data.

Figure 19:
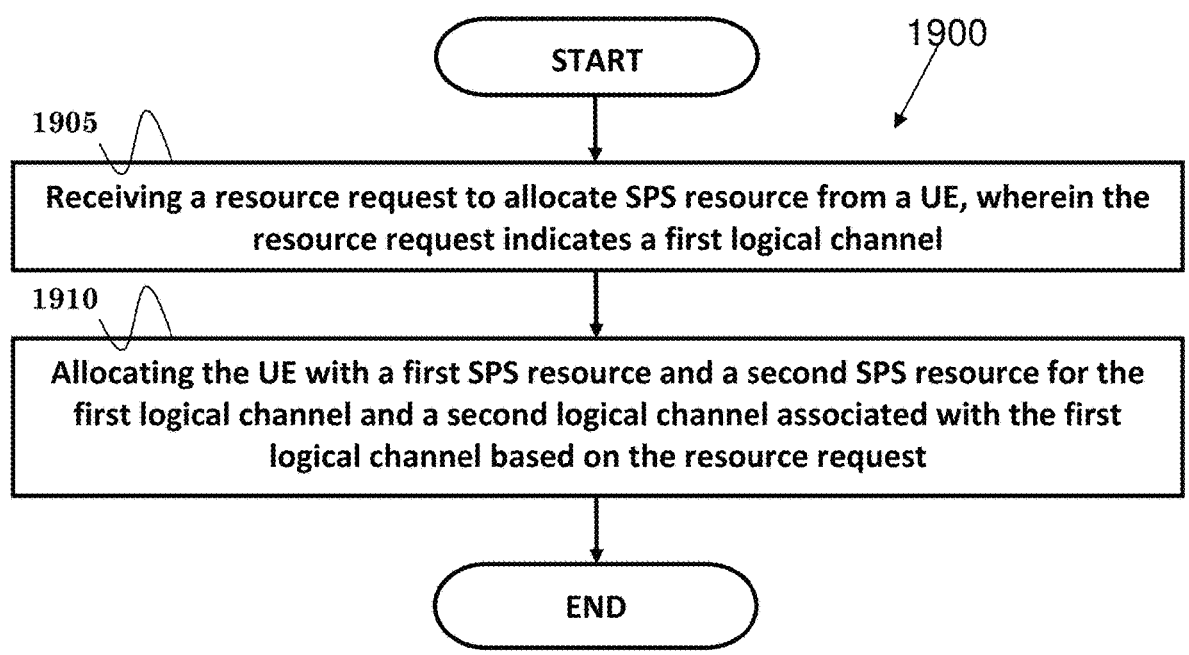
FIG. 19 is a flow chart according to one exemplary embodiment.

FIG. 19 is a flow chart 1900 according to one exemplary embodiment from the perspective of a network node. Step 1905 includes receiving a resource request to allocate SPS resource from a UE, wherein the resource request indicates a first logical channel. Step 1910 includes allocating the UE with a first SPS resource and a second SPS resource for the first logical channel and a second logical channel associated with the first logical channel based on the resource request.

In one embodiment, the resource request could indicate the second logical channel. Furthermore, the second logical channel could be different from the first logical channel.

In one embodiment, the network node could configure the UE with a SPS configuration, wherein the SPS configuration is associated with a SPS configuration index. The network node could also schedule the UE with the first SPS resource via a first communication link and the second SPS resource via a second communication link. The first communication link could be different from the second communication link.

In one embodiment, the network node could transmit to the UE a first downlink control information indicating the first SPS resource, wherein the first downlink control information includes the SPS configuration index. In addition, the network could transmit to the UE a second downlink control information indicating the second SPS resource, wherein the second downlink control information includes the SPS configuration index.

In one embodiment, the network node could configure the UE with a first SPS configuration and a second SPS configuration, wherein the first SPS configuration is associated with a first SPS configuration index and the second SPS configuration is associated with a second SPS configuration index. The first SPS configuration index could be the same as the second SPS configuration index.

In one embodiment, the network node could transmit to the UE a first downlink control information indicating the first SPS resource, wherein the first downlink control information includes the first SPS configuration index. The network node could also transmit to the UE a second downlink control information indicating the second SPS resource, wherein the second downlink control information includes the second SPS configuration index.

Referring back to FIGS. 3 and 4, in one exemplary embodiment of a network node, the device 300 includes a program code 312 stored in the memory 310. The CPU 308 could execute program code 312 to enable the network node (i) to receive a resource request to allocate SPS resource from a UE, wherein the resource request indicates a first logical channel, and (ii) to allocate the UE with a first SPS resource and a second SPS resource for the first logical channel and a second logical channel associated with the first logical channel based on the resource request. Furthermore, the CPU 308 can execute the program code 312 to perform all of the above-described actions and steps or others described herein.

Figure 20:
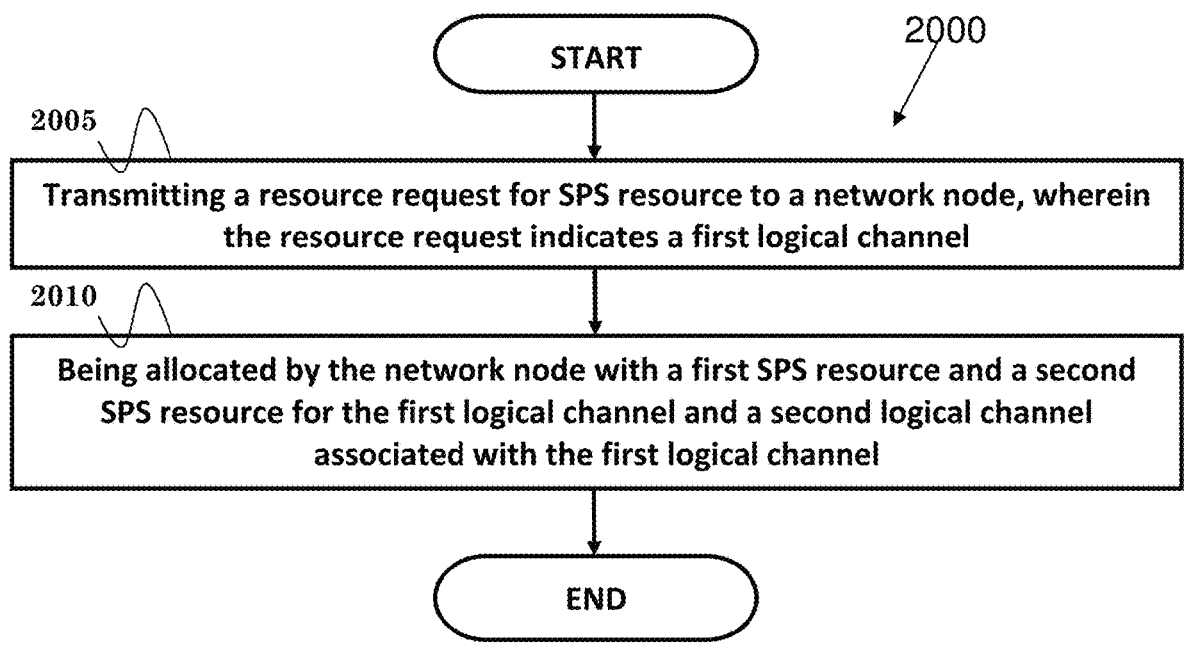
FIG. 20 is a flow chart according to one exemplary embodiment.

FIG. 20 is a flow chart 2000 according to one exemplary embodiment from the perspective of a UE. Step 2005 includes transmitting a resource request for SPS resource to a network node, wherein the resource request indicates a first logical channel. Step 2010 includes the UE being allocated by the network node with a first SPS resource and a second SPS resource for the first logical channel and a second logical channel associated with the first logical channel.

In one embodiment, the resource request could indicate the second logical channel. The second logical channel could be different from the first logical channel.

In one embodiment, the UE could be configured with a SPS configuration by the network node, wherein the SPS configuration is associated with a SPS configuration index. Furthermore, the UE could be scheduled by the network node with the first SPS resource via a first communication link and the second SPS resource via a second communication link. The first communication link could be different from the second communication link.

In one embodiment, the UE could receive a first downlink control information indicating the first SPS resource from the network node, wherein the first downlink control information includes the SPS configuration index. Furthermore, the UE could receive a second downlink control information indicating the second SPS resource from the network node, wherein the second downlink control information includes the SPS configuration index.

In one embodiment, the UE could be configured by the network node a first SPS configuration and a second SPS configuration, wherein the first SPS configuration is associated with a first SPS configuration index and the second SPS configuration is associated with a second SPS configuration index. The first SPS configuration index could be the same as the second SPS configuration index.

In one embodiment, the UE could receive a first downlink control information indicating the first SPS resource from the network node, wherein the first downlink control information includes the first SPS configuration index. Furthermore, the UE could receive a second downlink control information indicating the second SPS resource from the network node, wherein the second downlink control information includes the second SPS configuration index.

In one embodiment, the UE could establish the first logical channel and the second logical channel. The UE could also generate a packet for transmission, wherein the packet is delivered into the first logical channel and the second logical channel.

In one embodiment, the UE could trigger the resource request when the packet is available for transmission.

In one embodiment, the UE could use the first SPS resource to serve the first logical channel. The UE could also use the second SPS resource to serve the second logical channel.

In one embodiment, the UE could perform transmissions to the network node based on the first SPS resource and the second SPS resource.

Referring back to FIGS. 3 and 4, in one exemplary embodiment of a UE, the device 300 includes a program code 312 stored in the memory 310. The CPU 308 could execute program code 312 to enable the UE (i) to transmit a resource request for SPS resource to a network node, wherein the resource request indicates a first logical channel, and (ii) to be allocated by the network node with a first SPS resource and a second SPS resource for the first logical channel and a second logical channel associated with the first logical channel. Furthermore, the CPU 308 can execute the program code 312 to perform all of the above-described actions and steps or others described herein.

In the context of the embodiments illustrated in FIGS. 19-20 and described above, in one embodiment, the resource request indicating the first logical channel could mean that the resource request includes a SPS interval, a timing offset, a related message size, and/or an identity of the first logical channel. Alternatively, the resource request indicating the first logical channel could mean that an identity of the first logical channel could be associated with a SPS interval, a timing offset, and/or a message size related to the first logical channel and could be included in the resource request.

In one embodiment, the resource request indicating the second logical channel could mean that the resource request includes a SPS interval, a timing offset, a related message size, and/or an identity of the second logical channel. Alternatively, the resource request indicating the second logical channel could mean that an identity of the second logical channel could be associated with a SPS interval, a timing offset, and/or a message size related to the second logical channel and could be included in the resource request.

In one embodiment, the resource request could be a UEAssistanceInformation.

In one embodiment, the first logical channel and the second logical channel could be used to transmit the packet. Alternatively, the first logical channel could be used to transmit the packet; and the second logical channel could be used to transmit duplicate of the packet. In another alternative embodiment, the first logical channel could be used to transmit duplicate of the packet; and the second logical channel could be used to transmit the packet.

In one embodiment, the network node could be a base station or a gNB. The first communication link could be a TRP, a cell, or a beam. The second communication link could be a TRP, a cell, or a beam.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a network node, comprising:
   receiving a resource request from a UE (User Equipment) to allocate a first SPS (Semi-Persistent Scheduling) resource for a first logical channel and a second SPS resource for a second logical channel associated with the first logical channel, wherein the first logical channel is used to transmit a packet and the second logical channel is used to transmit a duplicate of the packet, and the resource request indicates an identity of the first logical channel without indicating an identity of the second logical channel;
   allocating resources for the UE with the first SPS resource for the first logical channel based on the resource request; and
   allocating resources for the UE with the second SPS resource for the second logical channel based on the resource request and the association between the first logical channel and the second logical channel.

2. The method of claim 1, further comprising:
   configuring the UE with a SPS configuration, wherein the SPS configuration is associated with a SPS configuration index.

3. The method of claim 1, further comprising:
   scheduling the UE with the first SPS resource via a first communication link and the second SPS resource via a second communication link.

4. The method of claim 2, further comprising:
   transmitting to the UE a first downlink control information indicating the first SPS resource, wherein the first downlink control information includes the SPS configuration index; and
   transmitting to the UE a second downlink control information indicating the second SPS resource, wherein the second downlink control information includes the SPS configuration index.

5. The method of claim 1, further comprising:
   configuring the UE with a first SPS configuration and a second SPS configuration, wherein the first SPS configuration is associated with a first SPS configuration index and the second SPS configuration is associated with a second SPS configuration index.

6. The method of claim 5, wherein the first SPS configuration index is the same as the second SPS configuration index.

7. The method of claim 1, wherein the resource request indicating the first logical channel means that the resource request includes a SPS interval, a timing offset, and/or a related message size.

8. The method of claim 1, wherein the resource request is a UEAssistanceInformation.

9. The method of claim 1, further including receiving the packet from the UE based on the first SPS resource and receiving the duplicate of the packet from the UE based on the second SPS resource.

10. A method for a UE (User Equipment), comprising:
    transmitting a resource request to a network node for requesting a first SPS (Semi-Persistent Scheduling) resource for a first logical channel, based on the resource request, and a second SPS resource for a second logical channel associated with the first logical channel, based on the resource request and the association between the first logical channel and the second logical channel, wherein the first logical channel is used to transmit a packet and the second logical channel is used to transmit a duplicate of the packet, and the resource request indicates an identity of the first logical channel without indicating an identity of the second logical channel; and
    being allocated resources by the network node with both the first SPS resource for the first logical channel and the second SPS resource for the second logical channel.

11. The method of claim 10, further comprising:
    being configured with a SPS configuration by the network node, wherein the SPS configuration is associated with a SPS configuration index.

12. The method of claim 10, further comprising:
    being scheduled by the network node with the first SPS resource via a first communication link and the second SPS resource via a second communication link.

13. The method of claim 11, further comprising:
    receiving a first downlink control information indicating the first SPS resource from the network node, wherein the first downlink control information includes the SPS configuration index; and
    receiving a second downlink control information indicating the second SPS resource from the network node, wherein the second downlink control information includes the SPS configuration index.

14. The method of claim 10, further comprising:
    being configured by the network node a first SPS configuration and a second SPS configuration, wherein the first SPS configuration is associated with a first SPS configuration index and the second SPS configuration is associated with a second SPS configuration index.

15. The method of claim 14, wherein the first SPS configuration index is the same as the second SPS configuration index.

16. The method of claim 14, further comprising:
    receiving a first downlink control information indicating the first SPS resource from the network node, wherein the first downlink control information includes the first SPS configuration index; and
    receiving a second downlink control information indicating the second SPS resource from the network node, wherein the second downlink control information includes the second SPS configuration index.

17. The method of claim 10, wherein the resource request indicating the first logical channel means that the resource request includes a SPS interval, a timing offset, and/or a related message size.

18. The method of claim 10, wherein the resource request is a UEAssistanceInformation.

19. The method of claim 10, further including transmitting the packet to the network node based on the first SPS resource and transmitting the duplicate of the packet to the network node based on the second SPS resource.

* * * * *